(12) United States Patent
Hilgendorff et al.

(10) Patent No.: US 11,549,417 B2
(45) Date of Patent: Jan. 10, 2023

(54) SELECTIVE CATALYTIC REDUCTION CATALYST FOR THE TREATMENT OF AN EXHAUST GAS OF A DIESEL ENGINE

(71) Applicant: BASF Corporation, Florham Park, NJ (US)

(72) Inventors: Marcus Hilgendorff, Hannover (DE); Karifala Dumbuya, Hannover (DE); Matthias Peter, Hannover (DE); Andreas Sundermann, Heidelberg (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 17/045,332

(22) PCT Filed: Apr. 23, 2019

(86) PCT No.: PCT/EP2019/060307
§ 371 (c)(1),
(2) Date: Oct. 5, 2020

(87) PCT Pub. No.: WO2019/206870
PCT Pub. Date: Oct. 31, 2019

(65) Prior Publication Data
US 2021/0172361 A1 Jun. 10, 2021

(30) Foreign Application Priority Data
Apr. 23, 2018 (EP) ..................... 18168695

(51) Int. Cl.
*F01N 3/20* (2006.01)
*B01J 6/00* (2006.01)
*B01J 23/22* (2006.01)
*B01J 29/072* (2006.01)
*B01J 37/00* (2006.01)
*B01J 37/02* (2006.01)

(52) U.S. Cl.
CPC ........... *F01N 3/2066* (2013.01); *B01J 6/001* (2013.01); *B01J 23/22* (2013.01); *B01J 29/072* (2013.01); *B01J 37/0045* (2013.01); *B01J 37/0215* (2013.01); *F01N 2370/04* (2013.01); *F01N 2590/08* (2013.01)

(58) Field of Classification Search
None
See application file for complete search history.

(56) References Cited

U.S. PATENT DOCUMENTS

| 7,601,662 | B2 | 10/2009 | Bull et al. | |
| 7,691,769 | B2 | 4/2010 | Ott | |
| 8,293,199 | B2 | 10/2012 | Beutel et al. | |
| 2011/0085942 | A1* | 4/2011 | Ogyu | B01D 46/2429 422/180 |
| 2011/0142737 | A1* | 6/2011 | Seyler | B01J 29/85 423/213.2 |
| 2013/0343975 | A1* | 12/2013 | Reichinger | B01J 23/6527 423/213.2 |
| 2015/0165422 | A1 | 6/2015 | Sung et al. | |
| 2016/0303549 | A1* | 10/2016 | Masuda | B01D 53/864 |
| 2016/0367937 | A1* | 12/2016 | Lu | B01J 29/076 |
| 2017/0087513 | A1* | 3/2017 | Chandler | B01J 37/0246 |
| 2017/0128913 | A1 | 5/2017 | Goffe | |
| 2017/0284264 | A1* | 10/2017 | Izumi | F01N 3/2066 |
| 2018/0043305 | A1* | 2/2018 | Voss | B01D 53/9477 |

FOREIGN PATENT DOCUMENTS

EP 0234441 * 2/1987

OTHER PUBLICATIONS

Liu, F., et al., "Selective catalytic reduction of NO with NH3 over iron titanate catalyst: Catalytic performance and characterizalion", Applied Catalysis B: Environmental, vol. 96, 2010, pp. 408-420.
Putluru, S.S.R., et al., "Mn/TiO2 and Mn-Fe/TiO2 catalysts synthesized by deposition precipitation—promising for selective catalytic reduction of NO with NH3 at low temperatures", Applied Catalysis B: Environmental, vol. 165, 2015, pp. 628-635.
Crandell, D.W., et al., "Computational and spectroscopic characterization of key intermediates of the Selective Catalytic Reduction cycle of NO on zeolite-supported Cu catalyst", Inorganica Chimica Acta, vol. 430, 2015, pp. 132-143.
Li, W., et al., "The enhanced Zn resistance of Mn/TiO2 catalyst tor NH3—SCR reaction by the modification with Nb", Fuel Processing Technology, vol. 154, 2016, pp. 235-242.
International Search Report dated Aug. 26, 2019 in PCT/EP2019/060307 filed on Apr. 23, 2019.

* cited by examiner

*Primary Examiner* — Sheng H Davis
(74) *Attorney, Agent, or Firm* — Finnegan, Henderson, Farabow, Garrett & Dunner, LLP

(57) ABSTRACT

The present invention relates to a selective catalytic reduction catalyst for the treatment of an exhaust gas of a diesel engine comprising: a flow-through substrate comprising an inlet end, an outlet end, a substrate axial length extending from the inlet end to the outlet end and a plurality of passages defined by internal walls of the flow through substrate extending therethrough; a coating disposed on the surface of the internal walls of the substrate, wherein the coating comprises a non-zeolitic oxidic material comprising manganese and one or more of the metals of the groups 4 to 11 and 13 of the periodic table, and further comprises one or more of a vanadium oxide and a zeolitic material comprising one or more of copper and iron.

16 Claims, 10 Drawing Sheets

SELECTIVE CATALYTIC REDUCTION CATALYST FOR THE TREATMENT OF AN EXHAUST GAS OF A DIESEL ENGINE

The present invention relates to a selective catalytic reduction catalyst for the treatment of an exhaust gas of a diesel engine. Further, the present invention relates to a process for preparing said selective catalytic reduction catalyst as well as to a method for selectively catalytically reducing nitrogen oxides using said catalyst.

The activity of manganese for the catalysis of the selective reduction of NOx with $NH_3$ (SCR-reaction) is described in the scientific literature. For example, Fudong Liua, et al., "Selective catalytic reduction of NO with $NH_3$ over iron titanate catalyst: Catalytic performance and characterization", Applied Catalysis B: Environmental 96 (2010), pages 408-420, describe a selective catalytic reduction catalyst comprising $Fe/TiO_2$ having improved low temperatures performance.

Siva Sankar Reddy Putlurua, et al., "$Mn/TiO_2$ and Mn—$Fe/TiO_2$ catalysts synthesized by deposition-precipitation—promising for selective catalytic reduction of NO with $NH_3$ at low temperatures", Applied Catalysis B: Environmental 165 (2015), pages 628-635, describe selective catalytic reduction catalysts comprising $Mn/TiO_2$ and Mn—$Fe/TiO_2$ having improved low temperatures performance and Wei Li, et al., "The enhanced Zn resistance of $Mn/TiO_2$ catalyst for $NH_3$—SCR reaction by the modification with Nb", Fuel Processing Technology 154 (2016), pages 235-242, also describe $Mn/TiO_2$ catalysts. In particular the application of titania impregnated with manganese and iron appears to have good activity and stability comparable to iron containing zeolitic material.

U.S. Pat. No. 7,691,769 B2 describes a selective catalytic reduction catalyst comprising Fe-containing MFI zeolitic material treated with manganese and cerium and forming Mn, CeO—Fe-ZSM-5 catalyst which shows improved low temperature activity. A disadvantage of manganese catalyst is however its sensitivity to poisoning by sulfur present in the exhaust gas. The manganese catalyst can be regenerated but this often requires temperatures of up to 700° C. or above to desorb the accumulated sulfur on the catalyst.

As an alternative, Douglas W. Crandell, et al., "Computational and spectroscopic characterization of key intermediates of the Selective Catalytic Reduction cycle of NO on zeolite-supported Cu catalyst", Inorganica Chimica Acta 430 (2015), pages 132-143, describe a Cu-SSZ13 zeolite used as a catalyst for a selective catalytic reduction of NO. U.S. Pat. No. 7,601,662 B2 discloses a catalyst for NOx conversion comprising Cu-CHA. However, Cu-CHA as a selective catalytic reduction catalyst triggers high nitrous oxide formation. Accordingly, there is a need to provide an improved selective catalytic reduction catalyst which reduces the nitrous oxide ($N_2O$) formation while being cost effective.

Therefore, it was an object of the present invention to provide a selective catalytic reduction catalyst for the treatment of an exhaust gas of a diesel engine exhibiting improved NOx conversion while reducing $N_2O$ formation under fresh and aged conditions and being cost effective.

Surprisingly, it was found that the selective catalytic reduction catalyst for the treatment of an exhaust gas of a diesel engine according to the present invention permits to improve the NOx conversion while reducing the nitrous oxide formation under fresh and aged conditions and being cost effective.

Therefore, the present invention relates to a selective catalytic reduction catalyst for the treatment of an exhaust gas of a diesel engine comprising:
(i) a flow-through substrate comprising an inlet end, an outlet end, a substrate axial length extending from the inlet end to the outlet end and a plurality of passages defined by internal walls of the flow through substrate extending therethrough;
(ii) a coating disposed on the surface of the internal walls of the substrate, wherein the coating comprises a non-zeolitic oxidic material comprising manganese and one or more of the metals of the groups 4 to 11 and 13 of the periodic table, and further comprises one or more of a vanadium oxide and a zeolitic material comprising one or more of copper and iron.

Preferably, the metals of the groups 4 to 11 and 13 are selected from the group consisting of aluminum, gallium, titanium, vanadium, chromium, iron, cobalt, nickel, copper, zirconium, niobium, molybdenum, tantalum and tungsten, more preferably selected from the group consisting of aluminum, titanium, vanadium, iron, cobalt, zirconium and tungsten.

It is preferred that the non-zeolitic oxidic material comprises manganese and one or more of titanium, vanadium, iron and tungsten, more preferably one or more of titanium and iron, more preferably titanium and iron, wherein titanium is present in the non-zeolitic oxidic material as titania.

It is preferred that the non-zeolitic oxidic material further comprises one or more of silicon, antimony, lanthanum, cerium, praseodymium and neodymium, more preferably one or more of silicon, lanthanum and cerium, more preferably silicon.

Preferably from 90 to 100 weight-%, more preferably from 95 to 100 weight-%, more preferably from 99 to 100 weight-% of the non-zeolitic oxidic material consist of manganese, titania, iron and silicon. More preferably from 70 to 90 weight-%, more preferably from 75 to 90 weight-%, more preferably from 80 to 90 weight-% of the non-zeolitic oxidic material consist of titania, from 2 to 8 weight-%, more preferably from 3 to 5 weight-% of the non-zeolitic oxidic material consist of manganese, calculated as MnO, from 2 to 8 weight-%, more preferably from 2 to 5 weight-% of the non-zeolitic oxidic material consist of silicon, calculated as $SiO_2$, and from 0.5 to 4 weight %, more preferably from 1 to 3 weight-% of the non-zeolitic oxidic material consist of iron, calculated as FeO.

Therefore, the present invention preferably relates to a selective catalytic reduction catalyst for the treatment of an exhaust gas of a diesel engine comprising:
(i) a flow-through substrate comprising an inlet end, an outlet end, a substrate axial length extending from the inlet end to the outlet end and a plurality of passages defined by internal walls of the flow through substrate extending therethrough;
(ii) a coating disposed on the surface of the internal walls of the substrate, wherein the coating comprises a non-zeolitic oxidic material comprising manganese and titanium and iron, and further comprises one or more of a vanadium oxide and a zeolitic material comprising one or more of copper and iron, wherein titanium is present in the non-zeolitic oxidic material as titania, wherein more preferably the non-zeolitic oxidic material further comprises one or more of silicon, antimony, lanthanum, cerium, praseodymium and neodymium, more preferably one or more of silicon, lanthanum and cerium, more preferably silicon.

In the context of the present invention, it is preferred that the non-zeolitic oxidic material comprises manganese and one or more of aluminum, vanadium, iron and tungsten, more preferably aluminum.

Preferably from 90 to 100 weight-%, more preferably from 95 to 100 weight-%, more preferably from 99 to 100 weight-% of the non-zeolitic oxidic material consists of oxygen, manganese and aluminum.

Therefore, the present invention preferably relates to a selective catalytic reduction catalyst for the treatment of an exhaust gas of a diesel engine comprising:
(i) a flow-through substrate comprising an inlet end, an outlet end, a substrate axial length extending from the inlet end to the outlet end and a plurality of passages defined by internal walls of the flow through substrate extending therethrough;
(ii) a coating disposed on the surface of the internal walls of the substrate, wherein the coating comprises a non-zeolitic oxidic material comprising manganese and aluminum, and further comprises one or more of a vanadium oxide and a zeolitic material comprising one or more of copper and iron.

In the context of the present invention, it is preferred that the non-zeolitic oxidic material comprises manganese and one or more of vanadium, cobalt, zirconium and tungsten, more preferably zirconium.

Preferably, the non-zeolitic oxidic material further comprises one or more of silicon, antimony, lanthanum, cerium, praseodymium and neodymium, more preferably one or more of silicon, lanthanum and cerium, more preferably lanthanum.

Preferably, the manganese comprised in the non-zeolitic oxidic material is present as $Mn_2O_3$.

Preferably from 90 to 100 weight-%, more preferably from 95 to 100 weight-%, more preferably from 99 to 100 weight-% of the non-zeolitic oxidic material consist of manganese, present as $Mn_2O_3$, zirconium and lanthanum. More preferably from 55 to 90 weight-%, more preferably from 60 to 80 weight-%, more preferably from 65 to 75 weight-% of the non-zeolitic oxidic material consist of manganese, present as $Mn_2O_3$, from 5 to 25 weight-%, more preferably from 10 to 20 weight-% of the non-zeolitic oxidic material consist of zirconium, calculated as $ZrO_2$, and from 5 to 25 weight-%, more preferably from 10 to 20 weight-% of the non-zeolitic oxidic material consist of lanthanum, calculated as $La_2O_3$.

Therefore, the present invention preferably relates to a selective catalytic reduction catalyst for the treatment of an exhaust gas of a diesel engine comprising:
(i) a flow-through substrate comprising an inlet end, an outlet end, a substrate axial length extending from the inlet end to the outlet end and a plurality of passages defined by internal walls of the flow through substrate extending therethrough;
(ii) a coating disposed on the surface of the internal walls of the substrate, wherein the coating comprises a non-zeolitic oxidic material comprising manganese and zirconium, and further comprises one or more of a vanadium oxide and a zeolitic material comprising one or more of copper and iron,
wherein more preferably the non-zeolitic oxidic material further comprises one or more of silicon, antimony, lanthanum, cerium, praseodymium and neodymium, more preferably one or more of silicon, lanthanum and cerium, more preferably lanthanum.

In the context of the present invention, it is preferred that in the catalyst, the non-zeolitic oxidic material comprised in the coating has a loading in the range of from 10 to 100 g/l, more preferably in the range of from 30 to 90 g/l, more preferably in the range of from 40 to 80 g/l, more preferably in the range of from 50 to 70 g/l.

Preferably, the coating comprises a zeolitic material comprising one or more of copper and iron.

Preferably, the zeolitic material comprised in the coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, more preferably selected from the group consisting of AEI, GME, CHA, MFI, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the coating has more preferably a framework type CHA or AEI, more preferably CHA.

Preferably the zeolitic material comprised in the coating comprises copper, wherein the amount of copper comprised in the zeolitic material, calculated as CuO, is more preferably in the range of 0.1 to 10 weight-%, more preferably in the range of from 1 to 8 weight-%, more preferably in the range of from 2 to 5 weight-%, more preferably in the range of from 2.5 to 4 weight-% based on the total weight of the zeolitic material. More preferably the amount of iron comprised in the zeolitic material of the coating, calculated as $Fe_2O_3$, is in the range of from 0 to 0.01 weight-%, more preferably in the range of from 0 to 0.001 weight-%, more preferably in the range of from 0 to 0.0001 weight-%, based on the total weight of the zeolitic material.

Preferably from 95 to 100 weight-%, more preferably from 98 to 100 weight-%, more preferably from 99 to 100 weight-% of the framework structure of the zeolitic material consist to Si, Al, 0, and optionally H, wherein in the framework structure, the molar ratio of Si to Al, calculated as molar $SiO_2:Al_2O_3$, is more preferably in the range of from 2:1 to 50:1, more preferably in the range of from 4:1 to 40:1, more preferably in the range of from 10:1 to 40:1, more preferably in the range of from 20:1 to 30:1.

It is preferred that the zeolitic material comprised in the coating comprises iron, wherein the amount of iron comprised in the zeolitic material, calculated as $Fe_2O_3$, is more preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein more preferably from 95 to 100 weight-%, more preferably from 98 to 100 weight-%, more preferably from 99 to 100 weight-% of the framework structure of the zeolitic material consist to Si, Al, 0, and optionally H, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 20:1 to 30:1.

In the context of the present invention, the zeolitic material comprised in the coating, which has a framework type CHA, has preferably a mean crystallite size of at least 0.5 micrometer determined via scanning electron microscopy.

It is preferred that in the catalyst, the coating comprises the zeolitic material at a loading in the range of from 60 to 300 g/l, more preferably in the range of from 80 to 250 g/l, more preferably in the range of from 100 to 220 g/l, more preferably in the range of from 140 to 200 g/l, more preferably in the range of from 150 to 190 g/l.

Therefore, the present invention preferably relates to a selective catalytic reduction catalyst for the treatment of an exhaust gas of a diesel engine comprising:
(i) a flow-through substrate comprising an inlet end, an outlet end, a substrate axial length extending from the inlet end to the outlet end and a plurality of passages defined by internal walls of the flow through substrate extending therethrough;
(ii) a coating disposed on the surface of the internal walls of the substrate, wherein the coating comprises a non-zeolitic oxidic material comprising manganese and titanium and iron, and further comprises a zeolitic material comprising one or more of copper and iron, more preferably copper, wherein the zeolitic material has a framework type CHA,
wherein titanium is present in the non-zeolitic oxidic material as titania, wherein more preferably the non-zeolitic oxidic material further comprises one or more of silicon, antimony, lanthanum, cerium, praseodymium and neodymium, more preferably one or more of silicon, lanthanum and cerium, more preferably silicon,
or
a coating disposed on the surface of the internal walls of the substrate, wherein the coating comprises a non-zeolitic oxidic material comprising manganese and aluminum, and further comprises a zeolitic material comprising one or more of copper and iron, more preferably copper, wherein the zeolitic material has a framework type CHA,
or
a coating disposed on the surface of the internal walls of the substrate, wherein the coating comprises a non-zeolitic oxidic material comprising manganese and zirconium, and further comprises a zeolitic material comprising one or more of copper and iron, more preferably copper, wherein the zeolitic material has a framework type CHA,
wherein more preferably the non-zeolitic oxidic material further comprises one or more of silicon, antimony, lanthanum, cerium, praseodymium and neodymium, more preferably one or more of silicon, lanthanum and cerium, more preferably lanthanum.

In the context of the present invention, it is preferred that the coating further comprises a metal oxide binder, wherein the metal oxide material more preferably comprises one or more of zirconia, alumina, titania, silica, and a mixed oxide comprising two or more of Zr, Al, Ti and Si, more preferably one or more of alumina and zirconia, more preferably zirconia. More preferably, in the catalyst, the coating comprises the metal oxide binder at a loading in the range of from 1 to 12 g/l, more preferably in the range of from 2 to 10 g/l, more preferably in the range of from 5 to 10 g/l, more preferably in the range of from 6 to 9 g/l.

Preferably from 90 to 100 weight-%, more preferably from 95 to 100 weight-%, more preferably from 99 to 100 weight-% of the coating consist of the non-zeolitic oxidic material, comprising manganese and one or more of the metals of the groups 4 to 11 and 13 of the periodic table, and the zeolitic material comprising one or more of copper and iron, wherein more preferably the zeolitic material has a framework type CHA and comprises copper, and more preferably a metal oxide binder as defined in the present invention.

It is preferred that the coating comprises a vanadium oxide, wherein the vanadium oxide is more preferably one or more of vanadium (V) oxide and a vanadium (IV) oxide, wherein the vanadium oxide optionally comprises one or more of tungsten, iron and antimony. More preferably, the vanadium oxide is supported on an oxidic material comprising one or more of titanium, silicon and zirconium, more preferably an oxidic material comprising one or more of titanium and silicon, more preferably titania and silica, more preferably on titania, wherein titania optionally contains one or more of tungsten and silicon.

Preferably from 90 to 100 weight-%, more preferably from 95 to 100 weight-%, more preferably from 99 to 100 weight-% of the coating consist of the non-zeolitic oxidic material, comprising manganese and one or more of the metals of the groups 4 to 11 and 13 of the periodic table, and the vanadium oxide.

Preferably, in the catalyst, the coating comprises the vanadium oxide, calculated as $V_2O_5$, at a loading in the range of from 1 to 5 weight-%, more preferably in the range of from 2 to 4 weight %, based on the total weight of the catalytic coating.

Therefore, the present invention preferably relates to a selective catalytic reduction catalyst for the treatment of an exhaust gas of a diesel engine comprising:
(i) a flow-through substrate comprising an inlet end, an outlet end, a substrate axial length extending from the inlet end to the outlet end and a plurality of passages defined by internal walls of the flow through substrate extending therethrough;
(ii) a coating disposed on the surface of the internal walls of the substrate, wherein the coating comprises a non-zeolitic oxidic material comprising manganese and titanium and iron, and further comprises a vanadium oxide, being more preferably one or more of vanadium (V) oxide and a vanadium (IV) oxide, wherein the vanadium oxide optionally comprises one or more of tungsten, iron and antimony,
wherein titanium is present in the non-zeolitic oxidic material as titania, wherein more preferably the non-zeolitic oxidic material further comprises one or more of silicon, antimony, lanthanum, cerium, praseodymium and neodymium, more preferably one or more of silicon, lanthanum and cerium, more preferably silicon,
or
a coating disposed on the surface of the internal walls of the substrate, wherein the coating comprises a non-zeolitic oxidic material comprising manganese and aluminum, and further comprises a vanadium oxide, being more preferably one or more of vanadium (V) oxide and a vanadium (IV) oxide, wherein the vanadium oxide optionally comprises one or more of tungsten, iron and antimony, or a coating disposed on the surface of the internal walls of the substrate, wherein the coating comprises a non-zeolitic oxidic material comprising manganese and zirconium, and further comprises a vanadium oxide, being more preferably one or more of vanadium (V) oxide and a vanadium (IV) oxide, wherein the vanadium oxide optionally comprises one or more of tungsten, iron and antimony, wherein more preferably the non-zeolitic oxidic material further comprises one or more of silicon, antimony, lanthanum, cerium, praseodymium and neodymium, more preferably one or more of silicon, lanthanum and cerium, more preferably lanthanum.

In the context of the present invention, it is preferred that from 0 to 0.001 weight-%, more preferably 0 to 0.0001 weight-%, more preferably from 0 to 0.00001 weight-% of the coating consist of palladium and platinum, preferably of palladium, platinum and rhodium, more preferably of palladium, platinum, rhodium, iridium and osmium, more preferably of noble metals. More preferably the coating is free of noble metals.

Preferably, in the catalyst, the coating comprises the non-zeolitic oxidic material zeolitic at a loading (l1) and the one or more of a vanadium oxide and a zeolitic material comprising one or more of copper and iron at a loading (l2), wherein the ratio of loading (l1) to loading (l2), (l1):(l2), is in the range of from 0.1:1 to 10:1, more preferably in the range of from 0.1:1 to 5:1, more preferably in the range of from 0.1:1 to 2:1, more preferably in the range of from 0.15:1 to 1:1, more preferably in the range of from 0.15:1 to 0.5:1, more preferably in the range of from 0.2:1 to 0.45:1.

It is preferred that the coating covers from 95 to 100%, more preferably from 98 to 100%, more preferably from 99 to 100% of the substrate axial length.

Preferably the flow-through substrate of the catalyst comprises a ceramic or metallic substance. More preferably, the flow-through substrate of the catalyst comprises, more preferably consists of, a ceramic substance, wherein the ceramic substance more preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite. Alternatively, more preferably the flow-through substrate of the catalyst comprises, more preferably consists of, a metallic substance, wherein the metallic substance more preferably comprises, more preferably consists of, oxygen and one or more of iron, chromium, and aluminum.

It is preferred that from 98 to 100 weight-%, more preferably from 99 to 100 weight-% of the catalyst consist of the flow-through substrate and the coating. More preferably the catalyst consists of the flow-through substrate and the coating.

The present invention further relates to an exhaust gas treatment system for treating an exhaust gas stream, preferably exiting from a diesel engine, comprising the selective catalytic reduction catalyst according to the present invention and one or more of a diesel oxidation catalyst, a selective catalytic reduction catalyst, an ammonia oxidation catalyst and a filter, preferably a particulate filter, more preferably a catalyzed particulate filter.

The present invention further relates to a process for preparing a selective catalytic reduction catalyst, preferably the selective catalytic reduction catalyst according to the present invention, comprising (a) providing a flow-through substrate comprising an inlet end, an outlet end, a substrate axial length extending from the inlet end to the outlet end and a plurality of passages defined by internal walls of the substrate extending therethrough;

(b) preparing a slurry comprising a non-zeolitic oxidic material comprising manganese and one or more of the metals of the groups 4 to 11 and 13 of the periodic table, and further comprises one or more of a vanadium oxide and a zeolitic material comprising one or more of copper and iron, and water;

(c) disposing the slurry obtained in (b) on the surface of the internal walls of the flow through substrate according to (a), obtaining a slurry-treated substrate;

(d) optionally drying the slurry-treated substrate obtained in (c), obtaining the substrate having a coating disposed thereon;

(e) calcining the slurry-treated substrate obtained in (c), or the substrate having a coating disposed thereon obtained in (d), obtaining the selective catalytic reduction catalyst.

Preferably, (b) comprises (b.1) forming a first slurry with water and a non-zeolitic oxidic material, preferably a powder, comprising manganese and one or more of the metals of the groups 4 to 11 and 13 of the periodic table, more preferably comprising manganese, titanium, iron and silicon, or more preferably comprising manganese, zirconium and lanthanum, or more preferably comprising manganese and aluminum;

(b.2) forming a second slurry with a zirconyl acetate mixture, a zeolitic material comprising one or more of copper and iron, and water; or with a solution of vanadium oxalate, more preferably adding an oxidic material, more preferably with a dispersant;

(b.3) mixing the first slurry obtained in (b.1) and the second slurry obtained in (b.2), more preferably at a temperature in the range of from 10 to 40° C., more preferably at a temperature in the range of from 15 to 30° C.

Preferably, (c) comprises disposing the slurry over 95 to 100%, more preferably 98 to 100%, more preferably 99 to 100% of the substrate axial length.

According to (c), disposing the slurry is preferably performed by wet impregnation or spraying, more preferably wet impregnation, more preferably dip-coating.

According to (d), the slurry-treated substrate obtained in (c) is preferably dried in gas atmosphere at a temperature in the range of from 90 to 200° C., more preferably in the range of from 100 to 160° C., more preferably in the range of from 110 to 130° C.

According to (d), the slurry-treated substrate obtained in (c) is preferably dried in gas atmosphere for a duration in the range of from 0.5 to 4 hours, more preferably in the range of from 1 to 3 hours.

As to (d), it is preferred that the gas atmosphere comprises, more preferably is, one or more of air, lean air, and oxygen, more preferably air.

According (e), the slurry-treated substrate obtained in (c), or the substrate having a coating disposed thereon obtained in (d), is preferably calcined at a temperature in the range of from 300 to 700° C., more preferably in the range of from 400 to 650° C., more preferably in the range of from 500 to 650° C.

According to (e), the slurry-treated substrate obtained in (c), or the substrate having a coating disposed thereon obtained in (d), is preferably calcined for a duration in the range of from 0.2 to 6 hours, more preferably in the range of from 0.5 to 4 hours, more preferably in the range of from 1 to 3 hours.

As to (e), it is preferred that the gas atmosphere comprises, more preferably is, one or more of air, lean air, and oxygen, more preferably air.

It is preferred that the process for preparing a selective catalytic reduction catalyst, more preferably the selective catalytic reduction catalyst according to the present invention, consists of (a) providing a flow through substrate comprising an inlet end, an outlet end, a substrate axial length extending from the inlet end to the outlet end and a plurality of passages defined by internal walls of the substrate extending therethrough;

(b) preparing a slurry comprising a non-zeolitic oxidic material comprising manganese and one or more of the metals of the groups 4 to 11 and 13 of the periodic table, and further comprises a selective catalytic reduction component comprising one or more of a vanadium oxide and a zeolitic material comprising one or more of copper and iron, and water;

(c) disposing the slurry obtained in (b) on the surface of the internal walls of the flow through substrate according to (a), obtaining a slurry-treated substrate;

(d) optionally drying the slurry-treated substrate obtained in (c), obtaining the substrate having a coating disposed thereon;

(e) calcining the slurry-treated substrate obtained in (c), or the substrate having a coating disposed thereon obtained in (d), obtaining the selective catalytic reduction catalyst.

The present invention further relates to a selective catalytic reduction catalyst, preferably the selective catalytic reduction catalyst of the present invention, obtainable or obtained by the process according to the present invention.

The present invention further relates to a use of the selective catalytic reduction catalyst according to the present invention, for the selective catalytic reduction of nitrogen oxides comprised in an exhaust gas stream, preferably from a diesel engine.

The present invention further relates to a method for selectively catalytically reducing nitrogen oxides, wherein the nitrogen oxides are comprised in an exhaust gas stream, said method comprising (1) providing the exhaust gas stream, preferably from a diesel engine;

(2) passing the exhaust gas stream provided in (1) through the selective catalytic reduction catalyst according to the present invention.

The present invention is illustrated by the following set of embodiments and combinations of embodiments resulting from the dependencies and back-references as indicated. In particular, it is noted that in each instance where a range of embodiments is mentioned, for example in the context of a term such as "The selective catalytic reduction catalyst of any one of embodiments 1 to 4", every embodiment in this range is meant to be explicitly disclosed for the skilled person, i.e. the wording of this term is to be understood by the skilled person as being synonymous to "The selective catalytic reduction catalyst of any one of embodiments 1, 2, 3 and 4".

1. A selective catalytic reduction catalyst for the treatment of an exhaust gas of a diesel engine comprising:
   (i) a flow-through substrate comprising an inlet end, an outlet end, a substrate axial length extending from the inlet end to the outlet end and a plurality of passages defined by internal walls of the flow through substrate extending therethrough;
   (ii) a coating disposed on the surface of the internal walls of the substrate, wherein the coating comprises a non-zeolitic oxidic material comprising manganese and one or more of the metals of the groups 4 to 11 and 13 of the periodic table, and further comprises one or more of a vanadium oxide and a zeolitic material comprising one or more of copper and iron.

2. The selective catalytic reduction catalyst of embodiment 1, wherein the metals of the groups 4 to 11 and 13 are selected from the group consisting of aluminum, gallium, titanium, vanadium, chromium, iron, cobalt, nickel, copper, zirconium, niobium, molybdenum, tantalum and tungsten, preferably selected from the group consisting of aluminum, titanium, vanadium, iron, cobalt, zirconium and tungsten.

3. The selective catalytic reduction catalyst of embodiment 1 or 2, wherein the non-zeolitic oxidic material comprises manganese and one or more of titanium, vanadium, iron and tungsten, preferably one or more of titanium and iron, more preferably titanium and iron, wherein titanium is present in the non-zeolitic oxidic material as titania.

4. The selective catalytic reduction catalyst of any one of embodiments 1 to 3, wherein the non-zeolitic oxidic material further comprises one or more of silicon, antimony, lanthanum, cerium, praseodymium and neodymium, preferably one or more of silicon, lanthanum and cerium, more preferably silicon.

5. The selective catalytic reduction catalyst of any one of embodiments 1 to 4, wherein from 90 to 100 weight-%, preferably from 95 to 100 weight-%, more preferably from 99 to 100 weight-% of the non-zeolitic oxidic material consists of manganese, titania, iron and silicon.

6. The selective catalytic reduction catalyst of embodiment 5, wherein from 70 to 90 weight %, preferably from 75 to 90 weight-%, more preferably from 80 to 90 weight-% of the nonzeolitic oxidic material consist of titania, from 2 to 8 weight-%, preferably from 3 to 5 weight-% of the non-zeolitic oxidic material consist of manganese, calculated as MnO, from 2 to 8 weight-%, preferably from 2 to 5 weight-% of the non-zeolitic oxidic material consist of silicon, calculated as $SiO_2$, and from 0.5 to 4 weight-%, preferably from 1 to 3 weight-% of the non-zeolitic oxidic material consist of iron, calculated as FeO.

7. The selective catalytic reduction catalyst of any one of embodiments 1 to 6, wherein the non-zeolitic oxidic material comprises manganese and one or more of aluminum, vanadium, iron and tungsten, preferably aluminum.

8. The selective catalytic reduction catalyst of embodiment 7, wherein from 90 to 100 weight %, preferably from 95 to 100 weight-%, more preferably from 99 to 100 weight-% of the non-zeolitic oxidic material consists of oxygen, manganese and aluminum.

9. The selective catalytic reduction catalyst of any one of embodiments 1 to 8, wherein the non-zeolitic oxidic material comprises manganese and one or more of vanadium, cobalt, zirconium and tungsten, preferably zirconium.

10. The selective catalytic reduction catalyst of any one of embodiments 1 to 9, wherein the non-zeolitic oxidic material further comprises one or more of silicon, antimony, lanthanum, cerium, praseodymium and neodymium, preferably one or more of silicon, lanthanum and cerium, more preferably lanthanum.

11. The selective catalytic reduction catalyst of any one of embodiments 1 to 10, wherein the manganese comprised in the non-zeolitic oxidic material is present as $Mn_2O_3$.
12. The selective catalytic reduction catalyst of any one of embodiments 1 to 11, wherein from 90 to 100 weight-%, preferably from 95 to 100 weight-%, more preferably from 99 to 100 weight-% of the non-zeolitic oxidic material consist of manganese, present as $Mn_2O_3$, zirconium and lanthanum.
13. The selective catalytic reduction catalyst of embodiment 12, wherein from 55 to 90 weight %, preferably from 60 to 80 weight-%, more preferably from 65 to 75 weight-% of the nonzeolitic oxidic material consist of manganese, present as $Mn_2O_3$, from 5 to 25 weight-%, preferably from 10 to 20 weight-% of the non-zeolitic oxidic material consist of zirconium, calculated as $ZrO_2$, and from 5 to 25 weight-%, preferably from 10 to 20 weight-% of the non-zeolitic oxidic material consist of lanthanum, calculated as $La_2O_3$.
14. The selective catalytic reduction catalyst of any one of embodiments 1 to 13, wherein in the catalyst, the non-zeolitic oxidic material comprised in the coating has a loading in the range of from 10 to 100 g/l, preferably in the range of from 30 to 90 g/l, more preferably in the range of from 40 to 80 g/l, more preferably in the range of from 50 to 70 g/l.
15. The selective catalytic reduction catalyst of any one of embodiments 1 to 14, wherein the coating comprises a zeolitic material comprising one or more of copper and iron.
16. The selective catalytic reduction catalyst of any one of embodiments 1 to 15, wherein the zeolitic material comprised in the coating has a framework type selected from the group consisting of ABW, ACO, AEI, AEL, AEN, AET, AFG, AFI, AFN, AFO, AFR, AFS, AFT, AFV, AFX, AFY, AHT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *-SSO, SSY, STF, STI, *STO, STT, STW, -SVR, SVV, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, a mixture of two or more thereof, and a mixed type of two or more thereof, preferably selected from the group consisting of AEI, GME, CHA, MFI, BEA, FAU, MOR, a mixture of two or more thereof and a mixed type of two or more thereof, more preferably selected from the group consisting of AEI, CHA, BEA, a mixture of two or more thereof and a mixed type of two or more thereof, wherein the zeolitic material comprised in the coating has more preferably a framework type CHA or AEI, more preferably CHA.
17. The selective catalytic reduction catalyst of embodiment 15 or 16, wherein the zeolitic material comprised in the coating comprises copper, wherein the amount of copper comprised in the zeolitic material, calculated as CuO, is preferably in the range of 0.1 to 10 weight-%, preferably in the range of from 1 to 8 weight-%, more preferably in the range of from 2 to 5 weight-%, more preferably in the range of from 2.5 to 4 weight-% based on the total weight of the zeolitic material.
18. The selective catalytic reduction catalyst of embodiment 17, wherein the amount of iron comprised in the zeolitic material of the coating, calculated as $Fe_2O_3$, is in the range of from 0 to 0.01 weight-%, preferably in the range of from 0 to 0.001 weight-%, more preferably in the range of from 0 to 0.0001 weight-%, based on the total weight of the zeolitic material.
19. The selective catalytic reduction catalyst of any one of embodiments 1 to 18, wherein from 95 to 100 weight-%, preferably from 98 to 100 weight-%, more preferably from 99 to 100 weight-% of the framework structure of the zeolitic material consist to Si, Al, 0, and optionally H, wherein in the framework structure, the molar ratio of Si to Al, calculated as molar $SiO_2:Al_2O_3$, is preferably in the range of from 2:1 to 50:1, more preferably in the range of from 4:1 to 40:1, more preferably in the range of from 10:1 to 40:1, more preferably in the range of from 20:1 to 30:1.
20. The selective catalytic reduction catalyst of any one of embodiments 1 to 19, wherein the zeolitic material comprised in the coating comprises iron, wherein the amount of iron comprised in the zeolitic material, calculated as $Fe_2O_3$, is preferably in the range of from 0.1 to 10.0 weight-%, more preferably in the range of from 1.0 to 7.0 weight-%, more preferably in the range of from 2.5 to 5.5 weight-%, based on the total weight of the zeolitic material, and wherein preferably from 95 to 100 weight-%, more preferably from 98 to 100 weight %, more preferably from 99 to 100 weight-% of the framework structure of the zeolitic material consist to Si, Al, 0, and optionally H, wherein in the framework structure, the molar ratio of Si to Al, calculated as $SiO_2:Al_2O_3$, is preferably in the range of from 2:1 to 50:1, more preferably in the range of from 4:1 to 40:1, more preferably in the range of from 10:1 to 40:1, more preferably in the range of from 20:1 to 30:1.
21. The selective catalytic reduction catalyst of any one of embodiments 16 to 20, wherein the zeolitic material comprised in the coating, which has a framework type CHA, has a mean crystallite size of at least 0.5 micrometer determined via scanning electron microscopy.
22. The selective catalytic reduction catalyst of any one of embodiments 1 to 21, wherein in the catalyst, the coating comprises the zeolitic material at a loading in the range of from 60 to 300 g/l, preferably in the range of from 80 to 250 g/l, more preferably in the range of from 100 to 220 g/l, more preferably in the range of from 140 to 200 g/l, more preferably in the range of from 150 to 190 g/l.
23. The selective catalytic reduction catalyst of any one of embodiments 1 to 22, wherein the coating further comprises a metal oxide binder, wherein the metal oxide material preferably comprises one or more of zirconia, alumina, titania, silica, and a mixed oxide comprising two or more of Zr, Al, Ti and Si, more preferably one or more of alumina and zirconia, more preferably zirconia, wherein in the catalyst, the coating more preferably comprises the metal oxide binder at a loading in the range of from 1 to 12 g/l, more preferably in the range of from 2 to 10 g/l, more preferably in the range of from 5 to 10 g/l, more preferably in the range of from 6 to 9 g/l.
24. The selective catalytic reduction catalyst of any one of embodiments 1 to 23, wherein from 90 to 100 weight-%, preferably from 95 to 100 weight-%, more preferably from 99 to 100 weight-% of the coating consist of the non-zeolitic oxidic material, comprising manganese and one or more of the metals of the groups 4 to 11 and 13 of the periodic table, and the zeolitic material comprising one or more of copper and iron, and preferably a metal oxide binder according to embodiment 23.
25. The selective catalytic reduction catalyst of any one of embodiments 1 to 24, wherein the coating comprises a vanadium oxide, wherein the vanadium oxide is preferably one or more of vanadium (V) oxide and a vanadium (IV) oxide, wherein the vanadium oxide optionally comprises one or more of tungsten, iron and antimony.
26. The selective catalytic reduction catalyst of embodiment 25, wherein the vanadium oxide is supported on an oxidic material comprising one or more of titanium, silicon and zirconium, preferably an oxidic material comprising one or more of titanium and silicon, more preferably titania and silica, more preferably on titania, wherein titania optionally contains one or more of tungsten and silicon.
27. The selective catalytic reduction catalyst of embodiment 25 or 26, wherein from 90 to 100 weight-%, preferably from 95 to 100 weight-%, more preferably from 99 to 100 weight-% of the coating consist of the non-zeolitic oxidic material, comprising manganese and one or more of the metals of the groups 4 to 11 and 13 of the periodic table, and the vanadium oxide.
28. The selective catalytic reduction catalyst of any one of embodiments 25 to 27, wherein in the catalyst, the coating comprises the vanadium oxide, calculated as $V_2O_5$, at a loading in the range of from 1 to 5 weight-%, preferably in the range of from 2 to 4 weight-%, based on the total weight of the catalytic coating.
29. The selective catalytic reduction catalyst of any one of embodiments 1 to 28, wherein from 0 to 0.001 weight-%, preferably 0 to 0.0001 weight-%, more preferably from 0 to 0.00001 weight-% of the coating consist of palladium and platinum, preferably of palladium, platinum and rhodium, more preferably of palladium, platinum, rhodium, iridium and osmium, more preferably of noble metals, more preferably the coating is free of noble metals.
30. The selective catalytic reduction catalyst of any one of embodiments 1 to 29, wherein in the catalyst, the coating comprises the non-zeolitic oxidic material zeolitic at a loading (l1) and the one or more of a vanadium oxide and a zeolitic material comprising one or more of copper and iron at a loading (l2), wherein the ratio of loading (l1) to loading (l2), (l1): (l2), is in the range of from 0.1:1 to 10:1, preferably in the range of from 0.1:1 to 5:1, more preferably in the range of from 0.1:1 to 2:1, more preferably in the range of from 0.15:1 to 1:1, more preferably in the range of from 0.15:1 to 0.5:1, more preferably in the range of from 0.2:1 to 0.45:1.
31. The selective catalytic reduction catalyst of any one of embodiments 1 to 30, wherein the coating covers from 95 to 100%, preferably from 98 to 100%, more preferably from 99 to 100% of the substrate axial length.
32. The selective catalytic reduction catalyst of any one of embodiments 1 to 31, wherein the flow-through substrate of the catalyst comprises a ceramic or metallic substance.
33. The selective catalytic reduction catalyst of any one of embodiments 1 to 32, wherein the flow-through substrate of the catalyst comprises, preferably consists of, a ceramic substance, wherein the ceramic substance preferably comprises, more preferably consists of, one or more of an alumina, a silica, a silicate, an aluminosilicate, preferably a cordierite or a mullite, an aluminotitanate, a silicon carbide, a zirconia, a magnesia, preferably a spinel, and a titania, more preferably one or more of a silicon carbide and a cordierite, more preferably a cordierite.
34. The selective catalytic reduction catalyst of any one of embodiments 1 to 32, wherein the flow-through substrate of the catalyst comprises, preferably consists of a metallic substance, wherein the metallic substance preferably comprises, more preferably consists of, oxygen and one or more of iron, chromium, and aluminum.
35. The selective catalytic reduction catalyst of any one of embodiments 1 to 34, wherein from 98 to 100 weight-%, preferably from 99 to 100 weight-% of the catalyst consist of the flow-through substrate and the coating.
36. The selective catalytic reduction catalyst of any one of embodiments 1 to 35, wherein the catalyst consists of the flow-through substrate and the coating.
37. An exhaust gas treatment system for treating an exhaust gas stream, preferably exiting from a diesel engine, comprising the selective catalytic reduction catalyst according to any one of embodiments 1 to 36 and one or more of a diesel oxidation catalyst, a selective catalytic reduction catalyst, an ammonia oxidation catalyst and a filter, preferably a particulate filter, more preferably a catalyzed particulate filter.
38. A process for preparing a selective catalytic reduction catalyst, preferably the selective catalytic reduction catalyst according to any one of embodiments 1 to 36, comprising
  (a) providing a flow-through substrate comprising an inlet end, an outlet end, a substrate axial length extending from the inlet end to the outlet end and a plurality of passages defined by internal walls of the substrate extending therethrough;
  (b) preparing a slurry comprising a non-zeolitic oxidic material comprising manganese and one or more of the metals of the groups 4 to 11 and 13 of the periodic table, and further comprises one or more of a vanadium oxide and a zeolitic material comprising one or more of copper and iron, and water;
  (c) disposing the slurry obtained in (b) on the surface of the internal walls of the flow through substrate according to (a), obtaining a slurry-treated substrate;
  (d) optionally drying the slurry-treated substrate obtained in (c), obtaining the substrate having a coating disposed thereon;
  (e) calcining the slurry-treated substrate obtained in (c), or the substrate having a coating disposed thereon obtained in (d), obtaining the selective catalytic reduction catalyst.
39. The process of embodiment 38, wherein (b) comprises
  (b.1) forming a first slurry with water and a non-zeolitic oxidic material, preferably a powder, comprising manganese and one or more of the metals of the groups 4 to 11 and 13 of the periodic table, preferably comprising manganese, titanium, iron and silicon, or preferably comprising manganese, zirconium and lanthanum, or preferably comprising manganese and aluminum;
  (b.2) forming a second slurry with a zirconyl acetate mixture, a zeolitic material comprising one or more of copper and iron, and water; or with a solution of vanadium oxalate, preferably adding an oxidic material, more preferably with a dispersant;
(b.3) mixing the first slurry obtained in (b.1) and the second slurry obtained in (b.2), preferably at a temperature in the range of from 10 to 40° C., more preferably at a temperature in the range of from 15 to 30° C.

40. The process of embodiment 38 or 39, wherein (c) comprises disposing the slurry over 95 to 100%, preferably 98 to 100%, more preferably 99 to 100% of the substrate axial length.
41. The process of any one of embodiments 38 to 40, wherein disposing the slurry according to (c) is performed by wet impregnation or spraying, preferably wet impregnation, more preferably dip-coating.
42. The process of any one of embodiments 38 to 41, wherein according to (d), the slurry-treated substrate obtained in (c) is dried in gas atmosphere at a temperature in the range of from 90 to 200° C., preferably in the range of from 100 to 160° C., more preferably in the range of from 110 to 130° C.
43. The process of any one of embodiments 38 to 42, wherein according to (d), the slurry-treated substrate obtained in (c) is dried in gas atmosphere for a duration in the range of from 0.5 to 4 hours, preferably in the range of from 1 to 3 hours.
44. The process of embodiment 42 or 43, wherein the gas atmosphere comprises, more preferably is, one or more of air, lean air, and oxygen, more preferably air.
45. The process of any one of embodiments 38 to 44, wherein according (e), the slurry-treated substrate obtained in (c), or the substrate having a coating disposed thereon obtained in (d), is calcined at a temperature in the range of from 300 to 700° C., preferably in the range of from 400 to 650° C., more preferably in the range of from 500 to 650° C.
46. The process of any one of embodiments 38 to 45, wherein according (e), the slurry-treated substrate obtained in (c), or the substrate having a coating disposed thereon obtained in (d), is calcined for a duration in the range of from 0.2 to 6 hours, preferably in the range of from 0.5 to 4 hours, more preferably in the range of from 1 to 3 hours.
47. The process of embodiment 45 or 46, wherein the gas atmosphere comprises, more preferably is, one or more of air, lean air, and oxygen, more preferably air.
48. The process of any one of embodiments 38 to 47 consisting of
(a) providing a flow through substrate comprising an inlet end, an outlet end, a substrate axial length extending from the inlet end to the outlet end and a plurality of passages defined by internal walls of the substrate extending therethrough;
(b) preparing a slurry comprising a non-zeolitic oxidic material comprising manganese and one or more of the metals of the groups 4 to 11 and 13 of the periodic table, and further comprises a selective catalytic reduction component comprising one or more of a vanadium oxide and a zeolitic material comprising one or more of copper and iron, and water;
(c) disposing the slurry obtained in (b) on the surface of the internal walls of the flow through substrate according to (a), obtaining a slurry-treated substrate;
(d) optionally drying the slurry-treated substrate obtained in (c), obtaining the substrate having a coating disposed thereon;
(e) calcining the slurry-treated substrate obtained in (c), or the substrate having a coating disposed thereon obtained in (d), obtaining the selective catalytic reduction catalyst.
49. A selective catalytic reduction catalyst, preferably the selective catalytic reduction catalyst of any one of embodiments 1 to 36, obtainable or obtained by the process according to any one of embodiments 38 to 48.
50. Use of the selective catalytic reduction catalyst according to any one of embodiments 1 to 36, or embodiment 49, for the selective catalytic reduction of nitrogen oxides comprised in an exhaust gas stream, preferably from a diesel engine.
51. A method for selectively catalytically reducing nitrogen oxides, wherein the nitrogen oxides are comprised in an exhaust gas stream, said method comprising
(1) providing the exhaust gas stream, preferably from a diesel engine;
(2) passing the exhaust gas stream provided in (1) through the selective catalytic reduction catalyst according to any one of embodiments 1 to 36 or the selective catalytic reduction catalyst according to embodiment 49.

In the context of the present invention, the term "the surface of the internal walls" is to be understood as the "naked" or "bare" or "blank" surface of the walls, i.e. the surface of the walls in an untreated state which consists—apart from any unavoidable impurities with which the surface may be contaminated—of the material of the walls.

The present invention is further illustrated by the following Reference Examples, Comparative Examples, and Examples.

EXAMPLES

Reference Example 1: Determination of the Dv90 Values

The particle size distributions were determined by a static light scattering method using Sympatec HELOS equipment, wherein the optical concentration of the sample was in the range of from 5 to 10%.

Reference Example 2: Preparation of Cu-CHA

The zeolitic material having the framework type CHA comprising Cu and used in the examples herein (Examples 1, 2 and 5, Comparative Examples 1-4) was prepared according to the teaching of U.S. Pat. No. 8,293,199 B2. Particular reference is made to Inventive Example 2 of U.S. Pat. No. 8,293,199 B2, column 15, lines 26 to 52.

Reference Example 3: Testing of Cu-CHA of Reference Example 2, of a Mixture of Oxides Comprising Titania and Manganese and a Mixture of Oxides Comprising Manganese Oxide—NOx Conversion and $N_2O$ Formation Powder tests have been carried for measuring the performance of pure Cu-CHA, mixture of oxides comprising titania and manganese and a mixture of oxides comprising manganese oxide, respectively, in NOx conversion and $N_2O$ make under standard SCR conditions (Gas Hourly Space Velocity (GHSV): 80000 $h^{-1}$, 500 ppm NO, 500 ppm $NH_3$, 5% $H_2O$, 10% $O_2$, balance $N_2$) and under fast SCR conditions (GHSV: 80000 $h^{-1}$, 125 ppm $NO_2$, 375 ppm NO, 500 ppm $NH_3$, 5% $H_2$, 10% $O_2$, balance $N_2$). 88 mg of a powder of Cu-CHA of Reference Example 2 (catalyst a), 120 mg of a powder comprising $Mn_2O_3$ (70 weight-%) impregnated with 15 weight-% of $La_2O_3$ and 15 weight-% of $ZrO_2$ (catalyst b) and 120 mg of a powder comprising $TiO_2$ (87.1 weight-%) with 3.6 weight-% of Si calculated as $SiO_2$, 1.9 weight-% of Fe, calculated as FeO and 4.1 weight-% of Mn, calculated as MnO (catalyst c), separately, were diluted to approximately 1 ml using corundum. Each sample corresponds to 1 ml of a coated catalyst with 2 g/in$^3$ washcoat loading. Catalysts a, b and c were aged in air with 10% steam at 650° C. for 50 hours.

The NOx conversions and the $N_2O$ formation during standard SCR reaction are shown in FIGS. 1 and 2. As may be taken from FIGS. 1 and 2, the pure Cu-CHA sample (catalyst a) has 30% NOx conversion at 175° C. and the NOx conversion increases rapidly to almost 100% at 250° C. This conversion rate stays almost constant up to temperatures of 575° C. Catalyst b exhibits 40% NOx conversion at 175° C., but said conversion increases less rapidly with increasing temperature compared to catalyst a. Moreover, the NOx conversion decreases from 70% at the maximum at 250° C. towards highly negative NOx conversion at high temperatures. It is assumed that negative NOx conversion means that $NH_3$ is more rapidly oxidized to NOx rather than to $N_2$. Furthermore, there is also a very high $N_2O$ formation with this material. To the contrary, for catalyst c, there is no NOx conversion at low temperatures and the maximum NOx conversion reaches 40% only at 450° C. Furthermore, there is also a higher NOx conversion, from 350 to 575° C., compared to catalyst b that indicates a lower $NH_3$ oxidation rate at higher temperatures. Only at 550° C. and 575° C., there is significant $N_2O$ formation with catalyst c and there is high $N_2O$ formation with catalyst b at 250 to 550° C.

The NOx conversions and the $N_2O$ formation during fast SCR reaction are shown in FIGS. 3 and 4. As may be taken from FIGS. 3 and 4, the NOx conversion is higher for all catalysts a, b and c. This is especially apparent for catalyst c that had no activity with NO only feed gas (standard SCR) at temperatures of 175 to 250° C. Here, the NOx conversion with catalyst c starts at 40% at 175° C. and increases to 50% at 300° C. There is only very little $N_2O$ formed. With respect to the NOx conversion with catalyst b, it can be recognized that it is more similar to the results with NO only (standard SCR), namely NOx conversion is highest at 175° C. compared to catalyst a and c and reaches 70% at its maximum at 250° C. but is reduced to 50% at 300° C. The $N_2O$ formation with catalyst b is still very high. For catalyst a, the $N_2O$ formation is relative low but higher compared to catalyst c. However, catalyst obtains the highest NOx conversions except for 175° C.

This example illustrated the different issues when using catalyst comprising only Cu-CHA, catalyst comprising only doped manganese and catalyst comprising only titania doped with manganese for standard and fast SCR reactions.

Reference Example 4: General Coating Method

In order to coat a flow-through substrate with a coating, the flow-through substrate was immersed vertically in a portion of a given slurry for a specific length of the substrate which was equal to the targeted length of the coating to be applied. In this manner, the washcoat contacted the walls of the substrate. The sample was left in the slurry for a specific period of time, usually for 1-10 seconds. The substrate was then removed from the slurry, and excess slurry was removed from the substrate by allowing it to drain from the substrate, then by blowing with compressed air (against the direction of slurry penetration).

Example 1: Preparation of a Catalyst According to the Present Invention a) Preparing a Fresh Catalyst Manganese oxide powder ($Mn_2O_3$ (70 weight-%) doped with 15 weight-% of $La_2O_3$ and 15 weight-% of $ZrO_2$, having a BET specific surface area of 85 m$^2$/g, a Dv90 of 10-25 micrometers, a solid content of 94 weight-%), corresponding to a final loading in the catalyst after calcination of 60 g/l, was mixed with deionized water. The resulting slurry having a solid content of 40 weight-% was milled with a ball mill to reach a Dv90 of 6 micrometers.

A zirconyl acetate mixture having a solid content of 15% by weight, such that the final zirconia loading (calculated as $ZrO_2$) in the catalyst was 8 g/l, was mixed with a Cu-zeolite (Chabazite with a $SiO_2$ to $Al_2O_3$ molar ratio (SAR) of 25 comprising 3.3 weight-% of Cu, calculated as CuO), corresponding to a final Cu-CHA loading in the catalyst after calcination of 170 g/l, deionized water. The resulting slurry was milled with a ball mill to reach until the resulting Dv90 determined as described in Reference Example 1 herewith was 5 micrometers.

The metal oxide slurry was added to the zeolite slurry and stirred for 30 min at room temperature, creating the final slurry having a solid content of 40 weight-%. The final slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with 400/(2.54)$^2$ cells per square centimeter and 0.135 millimeter thickness wall). Afterwards, the coated substrate was dried at a temperature of 120° C. for 2 hours and calcined at 600° C. for 2 hours. The washcoat loading of the coating after calcination was 238 g/l, including 170 g/l of Cu-CHA, 60 g/l of manganese (III) oxide with 15 weight % of La, calculated as $La_2O_3$, and 15 weight-% of Zr, calculated as $ZrO_2$, and 8 g/l of zirconia.

b) Ageing the Catalyst Obtained in a)

The catalyst obtained in a) was aged in air with 10% steam at 650° C. for 50 hours.

Example 2: Preparation of a Catalyst According to the Present Invention a) Preparing a Fresh Catalyst A titania slurry was prepared by mixing a titania powder ($TiO_2$ (87.1 weight-%) with 3.6 weight-% of Si calculated as $SiO_2$, 1.9 weight-% of Fe, calculated as FeO and 4.1 weight-% of Mn, calculated as MnO, having a BET specific surface area of 96 m$^2$/g) with deionized water. The resulting slurry having a solid content of 40 weight-% was milled with a ball mill until the resulting Dv90 determined as described in Reference Example 1 herewith was 5-10 micrometers.

A zirconyl acetate mixture having a solid content of 15% by weight, such that the final zirconia loading (calculated as $ZrO_2$) in the catalyst after calcination was 8 g/l, was mixed with a Cu-zeolite (Chabazite with a $SiO_2$ to $Al_2O_3$ molar ratio (SAR) of 25 comprising 3.3 weight-% of Cu calculated as CuO), corresponding to a final Cu-CHA loading in the catalyst after calcination of 170 g/l, and deionized water. The resulting slurry having a solid content of 40 weight-% was milled with a ball mill until the resulting Dv90 determined as described in Reference Example 1 herewith was 5 micrometers.

The titania slurry was added to the zeolite slurry and stirred for 30 min at room temperature, obtaining a final slurry having a solid content of 40 weight-%. The final slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with 400/(2.54)$^2$ cells per square centimeter an 0.13 millimeter thickness wall). Afterwards, the coated substrate was dried at a temperature of 120° C. for 2 hours and calcined at 600° C. for 2 hours. The washcoat loading after calcination was 238 g/l, including 170 g/l of Cu-CHA, 60 g/l of titania with 3.6 weight-% of Si calculated as $SiO_2$, 1.9 weight-% of Fe, calculated as FeO and 4.1 weight-% of Mn, calculated as MnO, and 8 g/l of zirconia.

b) Ageing the Catalyst Obtained in a)

The catalyst obtained in a) was aged in air with 10% steam at 650° C. for 50 hours.

Comparative Example 1: Preparation of a Catalyst not According to the Present Invention without Manganese and One or More Transition Metals a) Preparing a Fresh Catalyst A zirconyl acetate mixture having a solid content of 15% by weight, such that the final zirconia loading (calculated as $ZrO_2$) in the catalyst after calcination was 9 g/l, was mixed with a Cu-zeolite (Chabazite with a $SiO_2$ to $Al_2O_3$ molar ratio (SAR) of 25 comprising 3.3 weight-% of Cu calculated as CuO), corresponding to a final Cu-CHA loading in the catalyst after calcination of 174 g/l, and deionized water. The resulting slurry having a solid content of 40 weight-% was milled with a ball mill until the resulting Dv90 determined as described in Reference Example 1 herewith was 5 micrometers. The slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with 400/(2.56)$^2$ cells per square centimeter and 0.1 millimeter thickness wall). Afterwards, the coated substrate was dried at a temperature of 120° C. for 2 hours and calcined at 600° C. for 2 hours. The washcoat loading after calcination was 183 g/l, including 174 g/l of Cu-CHA and 9 g/l of zirconia.

b) Ageing the Catalyst Obtained in a)

The catalyst obtained in a) was aged in air with 10% steam at 650° C. for 50 hours.

Example 3: Use of the Catalyst of Examples 1 and 2 and Comparative Example 1—NOx Conversion and $N_2O$ Formation The aged catalysts of Examples 1 (b) and 2 (b) and Comparative Example 1 (b) were subjected to a selective catalytic reduction test under standard SCR conditions (GHSV: 80000 h$^{-1}$, 500 ppm NO, 500 ppm $NH_3$, 5% $H_2O$, 10% $O_2$, balance $N_2$) and under fast SCR conditions (GHSV: 80000 h$^{-1}$, 125 ppm $NO_2$, 375 ppm NO, 500 ppm $NH_3$, 5% $H_2O$, 10% $O_2$, balance $N_2$). The NOx conversion and the $N_2O$ formation were measured at temperatures ranging from 175 to 575° C. for standard SCR and from 175 to 300° C. for fast SCR.

The NOx conversions and the $N_2O$ formation during standard SCR reaction are shown in FIGS. 5 and 6. As may be taken from FIG. 5, from 175 to 200° C. and 300 to 450° C., the NOx conversions of the catalysts of Examples 1 and 2 and of Comparative Example 1 are similar. All samples almost reach 100% NOx conversion at 300° C. From 200 to 300° C., the NOx conversions obtained with the catalysts according to the present invention are slightly higher than with the comparative catalyst (2 to 3%). At higher temperatures, namely 550° C. and 575° C., the catalyst of Example 1 exhibits a lower NOx conversion (5 to 10%) compared the other two samples.

As may be taken from FIG. 6, the $N_2O$ formation obtained with the catalyst of Example 1 is of approximately 3 to 4 ppm at 175 to 300° C., whereas the $N_2O$ formation obtained with the catalyst of Comparative Example 1 is between 4.4 to 10.4 ppm with a peak at 250° C. At said peak, the $N_2O$ formation obtained with the catalysts according to the present invention is more than 50% lower than the $N_2O$ formation obtained with the catalyst of Comparative Example 1. Further the catalyst of Example 2 exhibits lower $N_2O$ formation compared to the catalyst of Comparative Example 1 over the whole temperature range, namely at temperatures from 175 to 575° C. This example demonstrates that, under standard SCR conditions, the catalyst according to the present invention with a non-zeolitic oxidic material comprising mainly manganese permits to reduce the $N_2O$ formation while maintaining or improving NOx conversion at low-medium temperatures, namely at 175 to 350° C., and that the catalyst according to the present invention with a non-zeolitic oxidic material comprising titania and manganese permits to improve the NOx conversion while reducing the $N_2O$ formation in a wide temperature range, namely at from 175 to 575° C.

The NOx conversions and the $N_2O$ formation during fast SCR reaction are shown in FIGS. 7 and 8. As may be taken from FIG. 7, from 175 to 250° C., the catalysts of Examples 1 and 2 exhibit improved NOx conversions compared to the catalyst of Comparative Example 1. At 300° C., the NOx conversions obtained from the three samples are of 100%. As may be taken from FIG. 8, the catalyst of Example 1 exhibits a $N_2O$ formation of from 3.8 to 6.0 ppm, the catalyst of Example 2 exhibits a $N_2O$ formation of from 4.3 to 7.7 ppm, whereas the catalyst of Comparative Example 1 exhibits a higher $N_2O$ formation of from 5.6 to 14.1 ppm. Thus, this example also demonstrates that under fast SCR conditions, the catalysts according to the present invention permit to obtain improved NOx conversion while decreasing the $N_2O$ formation at temperatures between 175° C. to 300° C.

Comparative Example 2: Preparation of a Catalyst not According to the Present Invention, with a Non-Zeolitic Oxidic Material Free of Manganese A titania slurry was prepared by mixing a titania powder ($TiO_2$ 88 weight-% and 6.5 weight-% of Si calculated as $SiO_2$, having a BET specific surface area of 200 m$^2$/g) were mixed with deionized water, corresponding to a final titania material loading in the catalyst after calcination of 60 g/l. The resulting slurry having a solid content of 40 weight-% was milled with a ball mill until the resulting Dv90 determined as described in Reference Example 1 herewith was 6 micrometers.

A zirconyl acetate mixture having a solid content of 15% by weight, such that the final zirconia loading (calculated as $ZrO_2$) in the catalyst after calcination was 8 g/l, was mixed with a Cu-zeolite (Chabazite with a $SiO_2$ to $Al_2O_3$ molar ratio (SAR) of 25 comprising 3.3 weight-% of Cu calculated as CuO), corresponding to a final Cu-CHA loading in the catalyst after calcination of 170 g/l, and deionized water. The resulting slurry having a solid content of 40 weight-% was milled with a ball mill until the resulting Dv90 determined as described in Reference Example 1 herewith was 5 micrometers.

The titania slurry was added to the zeolite slurry and stirred for 30 min at room temperature, forming the final slurry having a solid content of 40 weight-%. The final slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with $400/(2.56)^2$ cells per square centimeter and 0.1 millimeter thickness wall). Afterwards, the coated substrate was dried at a temperature of 120° C. for 2 hours and calcined at 600° C. for 2 hours. The washcoat loading of the coating in the catalyst after calcination was 238 g/l, including 170 g/l of Cu-CHA, 60 g/l of Si-containing titania and 8 g/l of zirconia.

Comparative Example 3: Preparation of a Catalyst Comprising Mn—Cu-CHA not According to the Present Invention, without a Non-Zeoltic Oxidic Material Comprising Manganese A zirconyl acetate mixture having a solid content of 15% by weight, such that the final zirconia loading (calculated as $ZrO_2$) in the catalyst after calcination was 8 g/l, was mixed with a Cu-zeolite (Chabazite with a $SiO_2$ to $Al_2O_3$ molar ratio (SAR) of 25 comprising 3.3 weight-% of Cu calculated as CuO), corresponding to a final Cu-CHA loading in the catalyst after calcination of 170 g/l, and deionized water. The resulting slurry having a solid content of 40 weight-% was milled with a ball mill until the resulting Dv90 determined as described in Reference Example 1 herewith was 5 micrometers. Further, 27 g of a manganese nitrate ($Mn(NO_3)_3$) solution (49 weight-% of Mn calculated as MnO) was added to the resulting slurry and mixed. The obtained slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with $400/(2.54)^2$ cells per square centimeter and 0.1 millimeter (4 mil) thickness wall). Afterwards, the coated substrate was dried at a temperature of 120° C. for 2 hours and calcined at 600° C. for 2 hours. The washcoat loading of the coating after calcination was 187 g/l, including 170 g/l of Cu-CHA, 9 g/l of manganese, calculated as MnO, and 8 g/l of zirconia.

Comparative Example 4: Preparation of a Catalyst not According to the Present Invention A titania slurry was prepared by mixing a titania powder ($TiO_2$ with 2 weight-% of Fe calculated as FeO and 4 weight-% Si calculated as $SiO_2$) were mixed with deionized water, corresponding to a final titania material loading in the catalyst after calcination of 60 g/l. The resulting slurry having a solid content of 40 weight-% was milled with a ball mill until the resulting Dv90 determined as described in Reference Example 1 herewith was 5 micrometers.

A zirconyl acetate mixture having a solid content of 15% by weight, such that the final zirconia loading (calculated as $ZrO_2$) in the catalyst after calcination was 8 g/l, was mixed with a Cu-zeolite (Chabazite with a $SiO_2$ to $Al_2O_3$ molar ratio (SAR) of 25 comprising 3.3 weight-% of Cu calculated as CuO), corresponding to a final Cu-CHA loading in the catalyst after calcination of 170 g/l, and deionized water. The resulting slurry having a solid content of 40 weight-% was milled with a ball mill until the resulting Dv90 determined as described in Reference Example 1 herewith was 5 micrometers. The titania slurry was added to the zeolite slurry and stirred for 30 min at room temperature, forming the final slurry having a solid content of 40 weight-%. The final slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with $400/(2.56)^2$ cells per square centimeter and 0.1 millimeter thickness wall). Afterwards, the coated substrate was dried at a temperature of 120° C. for 2 hours and calcined at 600° C. for 2 hours. The washcoat loading of the coating in the catalyst after calcination was 238 g/l, including 170 g/l of Cu-CHA, 60 g/l of Si/Fe-containing titania and 8 g/l of zirconia.

Example 4: Use of the Catalysts of Examples 1, 2, Comparative Examples 2, 3 and 4—NOx Conversion and $N_2O$ Formation The catalysts of Examples 1 (a), 2 (a) and Comparative Examples 2, 3 and 4 were aged in air with 10% steam at 800° C. for 16 hours and subjected to a selective catalytic reduction test (GHSV: 80000 h, 250 ppm $NO_2$, 250 ppm NO, 750 ppm $NH_3$, 5% $H_2O$, 10% $O_2$, balance $N_2$). The NOx conversion and the $N_2O$ formation were measured at temperatures ranging from 140 to 350° C., the results are depicted in FIGS. 9 and 10.

As may be taken from FIG. 9, the NOx conversions obtained with the catalysts of Example 1 and of Comparative Example 3 are approximately similar. However, the catalyst of Comparative Example 3, which has been prepared by using manganese nitrate solution, exhibits higher $N_2O$ formation. For example, at approximately 240° C., there is more than 16 ppm of $N_2O$ formed with the catalyst of Comparative Example 3 while there is approximately 11 ppm of $N_2O$ formed with the catalyst of Example 1. Furthermore, the NOx conversions obtained with the catalyst of Example 2 are slightly greater than the NOx conversions obtained with the catalyst of Comparative Examples 2 and 4 and greater (from approximately 10-20%) than the NOx conversions obtained with the catalyst of Comparative Example 3. Further, the catalyst of Example 2 also exhibits lower $N_2O$ formation compared to the catalyst of Comparative Examples 2-4. For example, at 350° C., there is approximately 11 ppm of $N_2O$ formed with the catalyst of Example 2 while there is more than 15 ppm of $N_2O$ formed with the catalyst of Comparative Example 2, approximately 17 ppm of $N_2O$ formed with the catalyst of Comparative Example 3 and 15 ppm of $N_2O$ formed with the catalyst of Comparative Example 4. This example demonstrates that the catalyst according to the present invention with a non-zeolitic oxidic material comprising mainly manganese permits to reduce the $N_2O$ formation while maintaining good NOx conversion after a severe ageing and that the catalyst according to the present invention with a non-zeolitic oxidic material comprising titania and manganese permits to improve the NOx conversion while reducing the $N_2O$ formation after a severe ageing. Further, this example shows that using manganese as ions with a Cu-CHA does not permit to obtain a great NOx conversion while reducing the $N_2O$ formation after a severe ageing and that accordingly the presence of a non-zeolitic oxidic material comprising manganese is mandatory.

Example 5: Preparation of a Catalyst According to the Present Invention a) Preparing a Fresh Catalyst An oxidic slurry was prepared by mixing an oxidic powder (95.4 weight-% of $Al_2O_3$ (mixed oxide) and 4.6 weight-% of $MnO_2$ (mixed oxide), having a BET specific surface area of 140 $m^2$/g, a total pore volume of 0.82 ml/g and a Dv50 of 54 micrometers) with deionized water.

A zirconyl acetate mixture having a solid content of 15% by weight, such that the final zirconia loading (calculated as $ZrO_2$) in the catalyst after calcination was 8 g/l, was mixed with a Cu-zeolite (Chabazite with a $SiO_2$ to $Al_2O_3$ molar ratio (SAR) of 25 comprising 3.3 weight-% of Cu calculated as CuO), corresponding to a final Cu-CHA loading in the catalyst after calcination of 170 g/l, and deionized water. The resulting slurry having a solid content of 40 weight-% was milled with a ball mill until the resulting Dv90 determined as described in Reference Example 1 herewith was 5 micrometers. The oxidic slurry was added to the zeolite slurry and stirred for 30 min at room temperature. The final slurry was then disposed over the full length of an uncoated honeycomb cordierite monolith substrate using the coating method described in Reference Example 4 (diameter: 10.16 cm (4 inches)×length: 2.54 cm (1 inch) cylindrically shaped with $400/(2.54)^2$ cells per square centimeter an 0.13 millimeter thickness wall). Afterwards, the coated substrate was dried at a temperature of 120° C. for 2 hours and calcined at 600° C. for 2 hours. The washcoat loading after calcination was 238 g/l, including 170 g/l of Cu-CHA, 60 g/l of aluminum-manganese oxide and 8 g/l of zirconia.

b) Ageing the Catalyst Obtained in a)

The catalyst obtained in a) was aged in air with 10% steam at 650° C. for 50 hours.

Example 6: Use of the Catalyst of Example 5 and Comparative Example 1—NOx Conversion and $N_2O$ Formation The aged catalysts of Example 5 (b) and Comparative Example 1 (b) were subjected to a selective catalytic reduction test under standard SCR conditions (GHSV: 80000 $h^{-1}$, 500 ppm NO, 500 ppm $NH_3$, 5% $H_2O$, 10% $O_2$, balance $N_2$) and under fast SCR conditions (GHSV: 80000 $h^{-1}$, 125 ppm $NO_2$, 375 ppm NO, 500 ppm $NH_3$, 5% $H_2O$, 10% $O_2$, balance $N_2$). The NOx conversion and the $N_2O$ formation were measured at temperatures ranging from 175 to 575° C. for standard SCR and from 175 to 250° C. for fast SCR. The results are displayed in Tables 1 and 2 below.

TABLE 1

Results under standard SCR conditions

| | Example 5 | | Comparative Example 1 | |
|---|---|---|---|---|
| Temperature (° C.) | NOx conversion (%) | $N_2O$ formation (ppm) | NOx conversion (%) | $N_2O$ formation (ppm) |
| 175 | 27.4 | 3.3 | 27.5 | 4.4 |
| 200 | 59.5 | 3.4 | 59.0 | 6.7 |
| 225 | 90.2 | 3.7 | 87.4 | 9.6 |
| 250 | 97.9 | 3.8 | 96.4 | 10.4 |
| 300 | 98.9 | 3.5 | 98.9 | 8.9 |
| 450 | 97.9 | 2.3 | 98.1 | 4.0 |
| 550 | 96.6 | 4.6 | 95.7 | 8.1 |
| 575 | 95.4 | 6.1 | 94.7 | 9.4 |

TABLE 2

Results under fast SCR conditions

| | Example 5 | | Comparative Example 1 | |
|---|---|---|---|---|
| Temperature (° C.) | NOx conversion (%) | $N_2O$ formation (ppm) | NOx conversion (%) | $N_2O$ formation (ppm) |
| 175 | 52.3 | 3.7 | 48.1 | 5.6 |
| 200 | 79.3 | 5.5 | 75.3 | 9.9 |
| 225 | 96.3 | 6.7 | 93.0 | 13.2 |
| 250 | 99.9 | 7.2 | 98.9 | 14.1 |

As may be taken from Tables 1 and 2, the NOx conversions obtained with the catalyst of Example 5 are approximately similar or higher than those obtained with the catalyst of Comparative Example 1. However, the catalyst of Comparative Example 1 exhibits higher $N_2O$ formation. For example, under standard conditions, at 250° C., there is 10.4 ppm of $N_2O$ formed with the catalyst of Comparative Example 1 while there is approximately 3.8 ppm of $N_2O$ formed with the catalyst of Example 5 (a $N_2O$ formation more than 2.5 times lower than with the comparative example) and said inventive catalyst exhibits a better NOx conversion. Under fast SCR conditions, the NOx conversions obtained with the catalyst of Example 5 are higher than those obtained with the catalyst of Comparative Example 1 and the catalyst of Comparative Example 1 exhibits higher $N_2O$ formation. In particular, at 225° C., there is 13.2 ppm of $N_2O$ formed with the catalyst of Comparative Example 1, which exhibits a NOx conversion of 93%, while there is approximately 6.7 ppm of $N_2O$ formed with the catalyst of Example 5 which exhibits a higher NOx conversion of 96.3%. Thus, this example demonstrates that under fast and standard SCR conditions, the catalysts according to the present invention permit to obtain improved NOx conversion while decreasing the $N_2O$ formation.

Example 7: Use of the Catalysts of Example 5 and Comparative Example 1—NOx Conversion and $N_2O$ Formation The catalysts of Example 5 (a) and Comparative Example 1 (a) were aged in air with 10% steam at 800° C. for 16 hours and were subjected to a selective catalytic reduction test under standard SCR conditions (GHSV: 80000 $h^{-1}$, 500 ppm NO, 500 ppm $NH_3$, 5% $H_2O$, 10% $O_2$, balance $N_2$). The NOx conversion and the $N_2O$ formation were measured at temperatures ranging from 175 to 575° C. for standard SCR. The results are depicted in Table 3 below.

TABLE 3

Results under standard SCR conditions

| | Example 5 | | Comparative Example 1 | |
|---|---|---|---|---|
| Temperature (° C.) | NOx conversion (%) | $N_2O$ formation (ppm) | NOx conversion (%) | $N_2O$ formation (ppm) |
| 175 | 25.8 | 0.5 | 27.8 | 1.6 |
| 200 | 55.1 | 1.1 | 56.4 | 4.0 |
| 250 | 96.3 | 2.1 | 95.1 | 7.2 |
| 300 | 98.7 | 2.6 | 98.6 | 7.3 |
| 550 | 91.4 | 5.0 | 88.4 | 12.7 |
| 575 | 89.9 | 6.2 | 85.3 | 13.9 |

As may be taken from Table 3, the NOx conversions obtained with the catalyst of Example 5 are approximately similar or higher than those obtained with the catalyst of Comparative Example 1. However, the catalyst of Comparative Example 1 exhibits higher $N_2O$ formation. In particular, at 250° C., there is 7.2 ppm of $N_2O$ formed with the catalyst of Comparative Example 1 while there is approximately 2.1 ppm of $N_2O$ formed with the catalyst of Example 5 (a $N_2O$ formation approximately 3.5 times lower than with the comparative example). Thus, this example demonstrates that the catalysts according to the present invention permit to obtain improved NOx conversion while decreasing the $N_2O$ formation even after a severe ageing.

CITED LITERATURE

Figure 1:
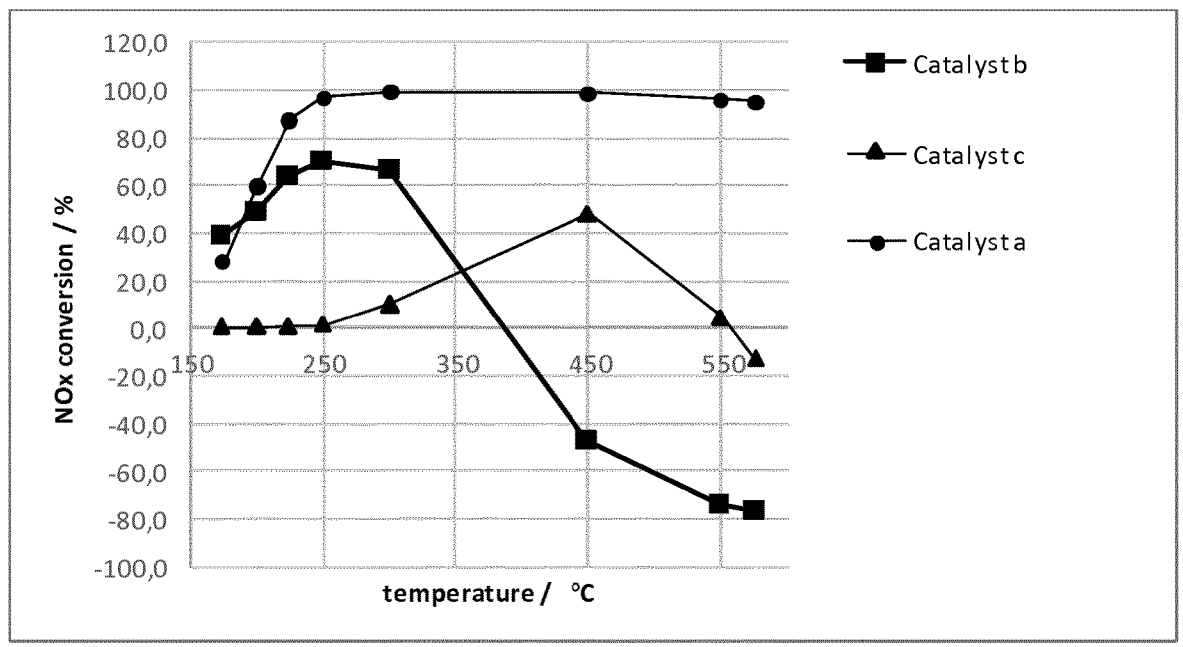
FIG. 1 shows the NOx conversions obtained with catalysts a, b and c not according to the present invention after ageing at 650° C. for 50 hours under standard SCR conditions.
Figure 2:
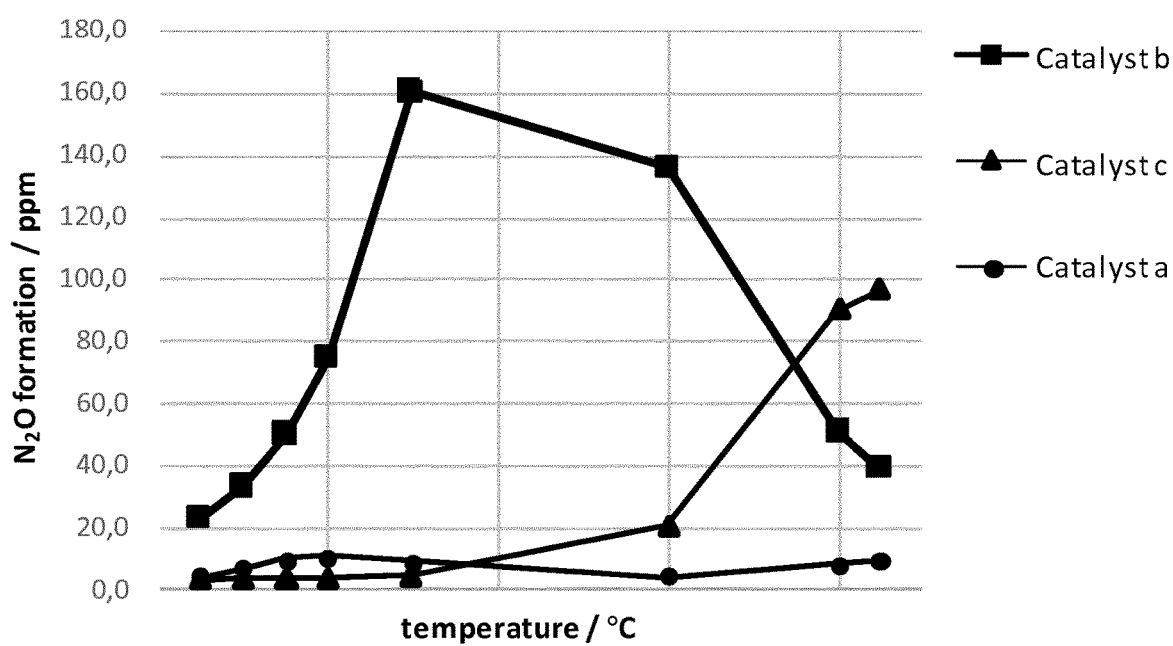
FIG. 2 shows the $N_2O$ formation obtained with catalysts a, b and c not according to the present invention after ageing at 650° C. for 50 hours under standard SCR conditions.
Figure 3:
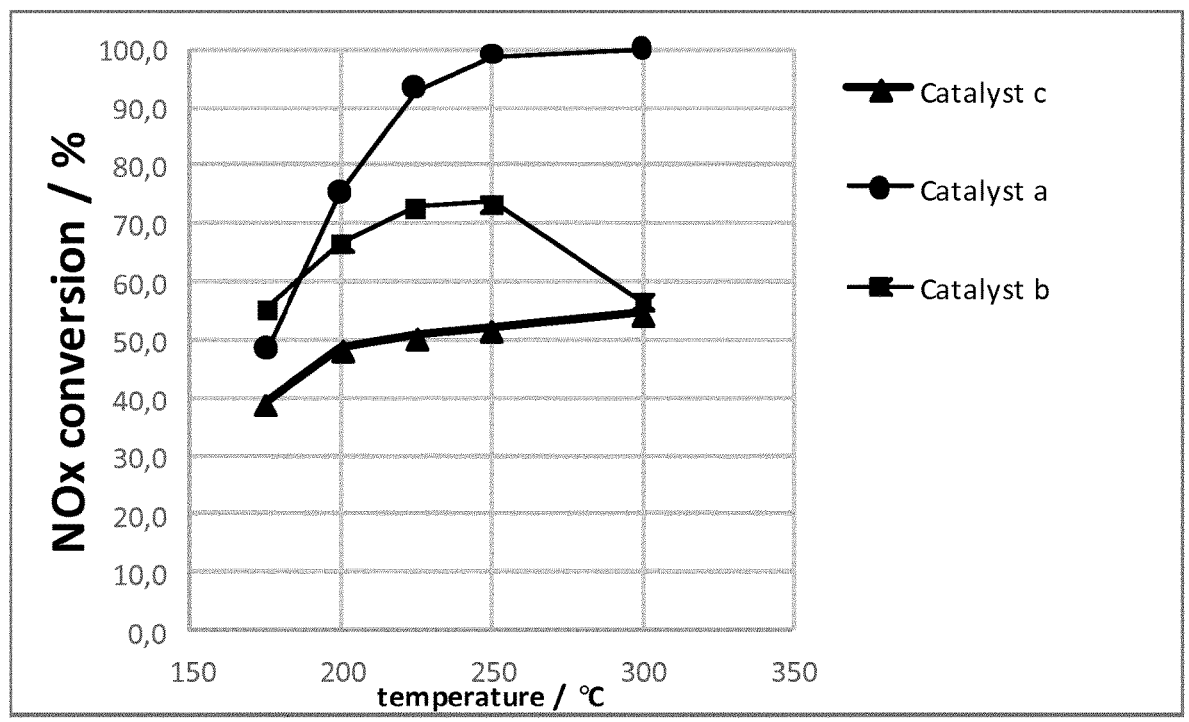
FIG. 3 shows the NOx conversions obtained with catalysts a, b and c not according to the present invention after ageing at 650° C. for 50 hours under fast SCR conditions.
Figure 4:
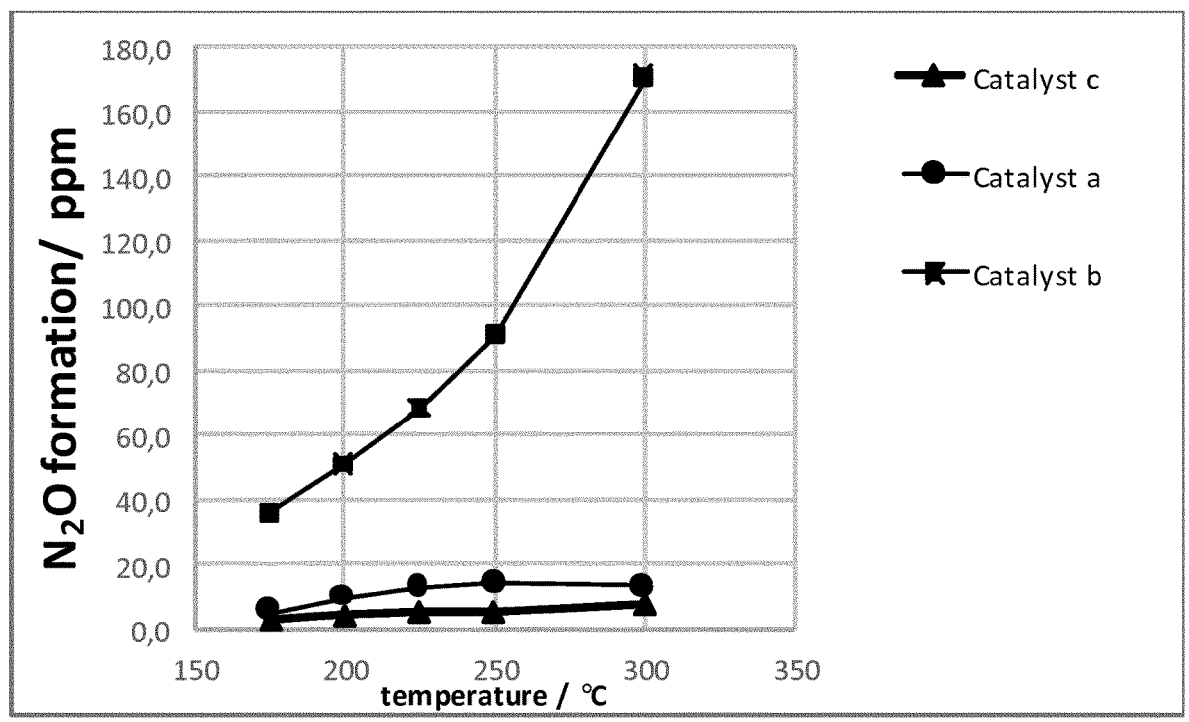
FIG. 4 shows the $N_2O$ formation obtained with catalysts a, b and c not according to the present invention after ageing at 650° C. for 50 hours under fast SCR conditions.
Figure 5:
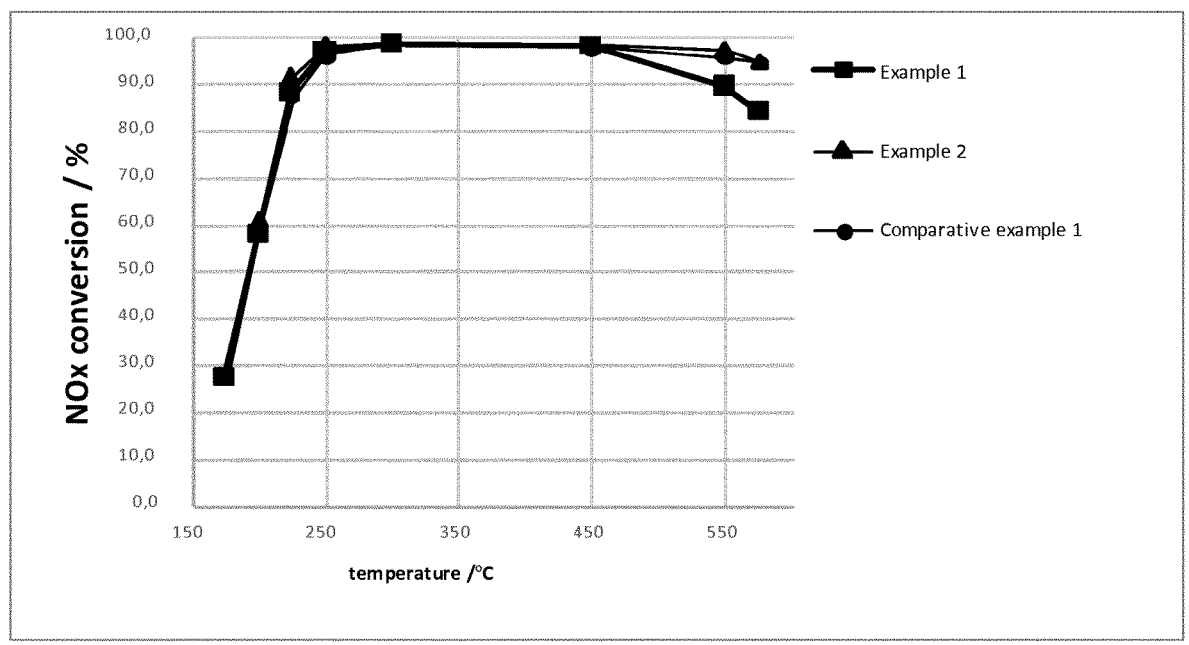
FIG. 5 shows the NOx conversions obtained with the catalysts of Examples 1 and 2 and of Comparative Example 1 after ageing at 650° C. for 50 hours under standard SCR conditions.
Figure 6:
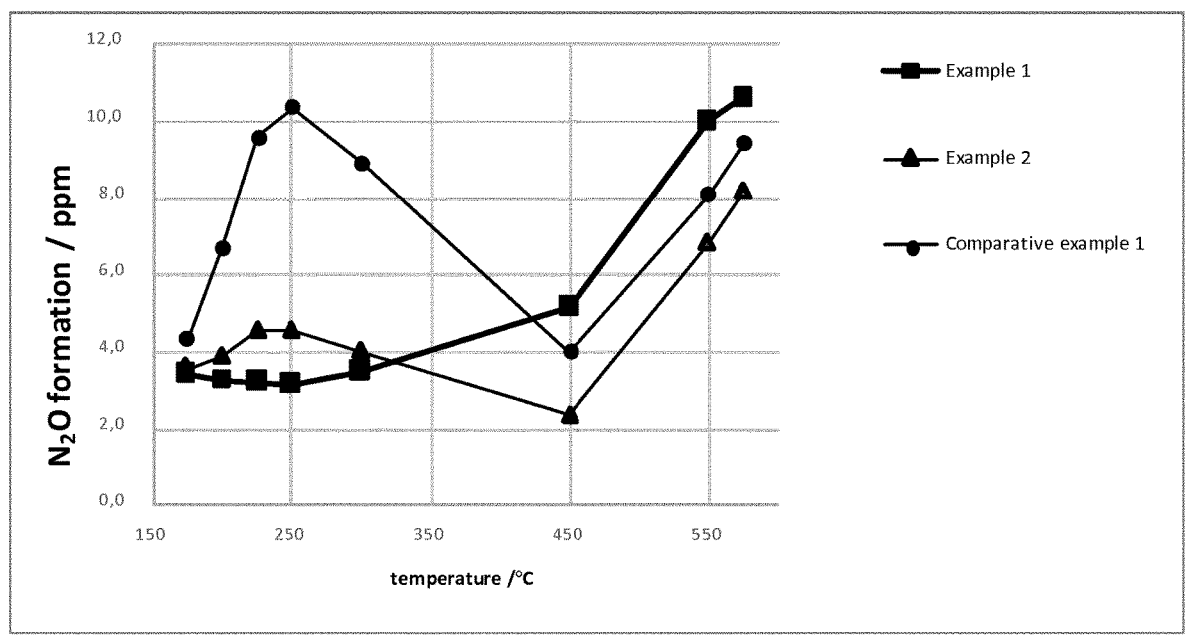
FIG. 6 shows the $N_2O$ formation obtained with the catalysts of Examples 1 and 2 and of Comparative Example 1 after ageing at 650° C. for 50 hours under standard SCR conditions.
Figure 7:
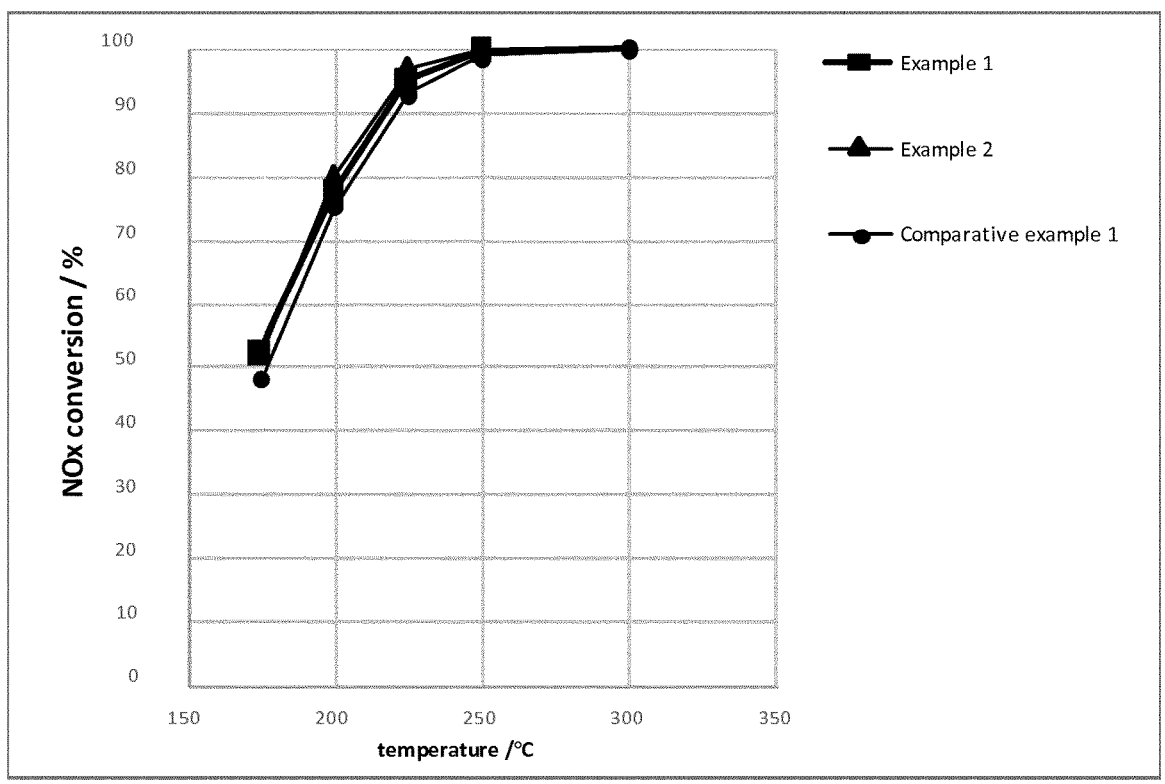
FIG. 7 shows the NOx conversions obtained with the catalysts of Examples 1 and 2 and of Comparative Example 1 after ageing at 650° C. for 50 hours under fast SCR conditions.
Figure 8:
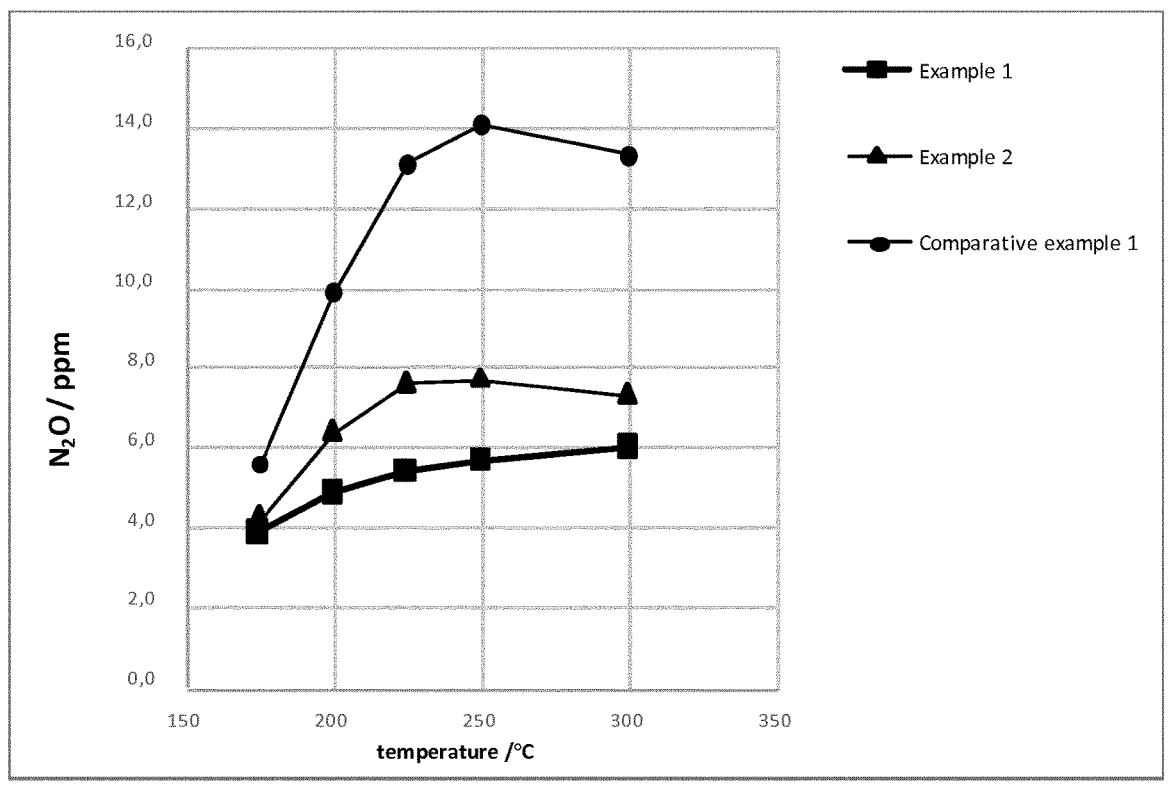
FIG. 8 shows the $N_2O$ formation obtained with the catalysts of Examples 1 and 2 and of Comparative Example 1 after ageing at 650° C. for 50 hours under fast SCR conditions.
Figure 9:
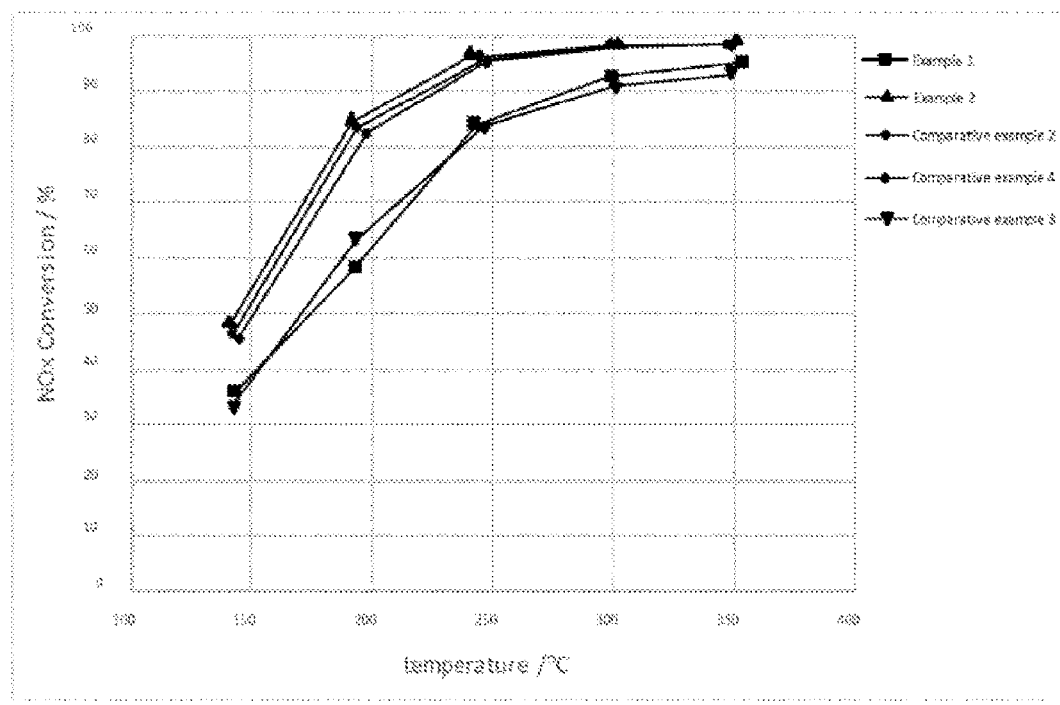
FIG. 9 shows the NOx conversions obtained with the catalysts of Examples 1, 2 and and of Comparative Examples 2, 3 and 4 after ageing at 800° C. for 16 hours with a gas feed comprising 250 ppm $NO_2$, 250 ppm NO, 750 ppm $NH_3$, 5% $H_2$, 10% $O_2$, balance $N_2$).
Figure 10:
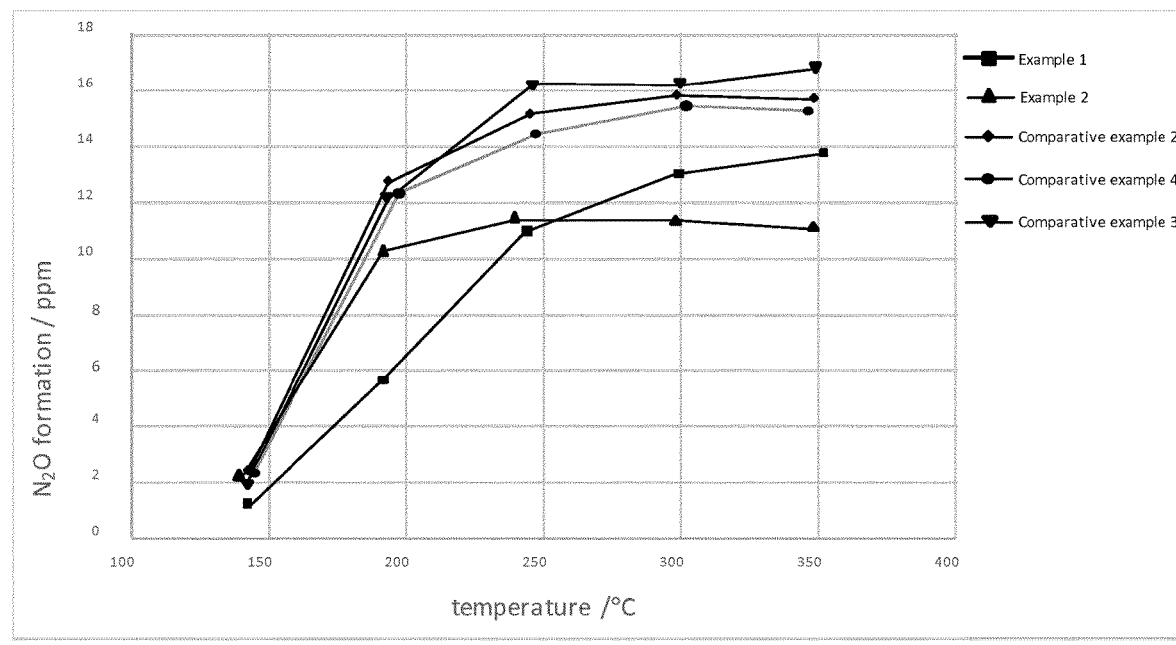
FIG. 10 shows the $N_2O$ formation obtained with the catalysts of Examples 1, 2 and of Comparative Examples 2, 3 and 4 after ageing at 800° C. for 16 hours with a gas feed comprising 250 ppm $NO_2$, 250 ppm NO, 750 ppm $NH_3$, 5% $H_2O$, 10% $O_2$, balance $N_2$).

Fudong Liua, et al., Selective catalytic reduction of NO with $NH_3$ over iron titanate catalyst: Catalytic performance and characterization, Applied Catalysis B: Environmental 96 (2010), pages 408-420

Siva Sankar Reddy Putlurua, et al., Mn/$TiO_2$ and Mn—Fe/$TiO_2$ catalysts synthesized by depositionprecipitation—promising for selective catalytic reduction of NO with $NH_3$ at low temperatures, Applied Catalysis B: Environmental 165 (2015), pages 628-635

Douglas W. Crandell, et al., Computational and spectroscopic characterization of key intermediates of the Selective Catalytic Reduction cycle of NO on zeolite-supported Cu catalyst, Inorganica Chimica Acta 430 (2015), pages 132-143

Wei Li, et al., The enhanced Zn resistance of Mn/$TiO_2$ catalyst for $NH_3$—SCR reaction by the modification with Nb, Fuel Processing Technology 154 (2016), pages 235-242

U.S. Pat. No. 7,691,769 B2
U.S. Pat. No. 7,601,662 B2
U.S. Pat. No. 8,293,199 B2

The invention claimed is:

1. A selective catalytic reduction catalyst for the treatment of an exhaust gas of a diesel engine, comprising:
   a flow-through substrate comprising an inlet end, an outlet end, a substrate axial length extending from the inlet end to the outlet end, and a plurality of passages defined by internal walls of the flow-through substrate extending therethrough; and
   a coating disposed on the surface of the internal walls of the substrate,
   wherein the coating comprises a non-zeolite oxide material comprising manganese and one or more metals of the groups 4 to 11 and 13 of the periodic table, and further comprises one or more of a vanadium oxide and a zeolite material comprising one or more of copper and iron,
   wherein the coating comprises the non-zeolite oxide material at a loading (l1), and the one or more of a vanadium oxide and a zeolite material comprising one or more of copper and iron at a loading (l2), and
   wherein the ratio of loading (l1) to loading (l2), (l1):(l2), is in the range of from 0.1:1 to 10:1
   wherein from 55 to 90 weight-% of the non-zeolitic oxidic material consist of manganese, present as $Mn_2O_3$ from 5 to 25 weight-% of the non-zeolitic oxidic material consist of zirconium, calculated as $ZrO_2$, and from 5 to 25 weight-% of the non-zeolitic oxidic material consist of lanthanum, calculated as $La_2O_3$.

2. The selective catalytic reduction catalyst of claim 1, wherein the one or more metals of the groups 4 to 11 and 13 of the periodic table are selected from the group consisting of aluminum, gallium, titanium, vanadium, chromium, iron, cobalt, nickel, copper, zirconium, niobium, molybdenum, tantalum, and tungsten.

3. The selective catalytic reduction catalyst of claim 1, wherein the one or more metals of the groups 4 to 11 and 13 of the periodic table are selected from the group consisting of titanium, vanadium, iron, and tungsten,
   wherein titanium, if present, is in the non-zeolite oxide material as titania, and
   wherein the non-zeolite oxide material further comprises at least one selected from the group consisting of silicon, antimony, lanthanum, cerium, praseodymium, and neodymium.

4. The selective catalytic reduction catalyst of claim 1, wherein the one or more metals of the groups 4 to 11 and 13 of the periodic table are selected from the group consisting of aluminum, vanadium, iron, and tungsten.

5. The selective catalytic reduction catalyst of claim 1, wherein the one or more metals of the groups 4 to 11 and 13 of the periodic table are selected from the group consisting of vanadium, cobalt, zirconium, and tungsten, wherein the non-zeolite oxide material further comprises one or more selected from the group consisting of silicon, antimony, lanthanum, cerium, praseodymium, and neodymium, and
wherein the manganese comprised in the non-zeolite oxide material is present as $Mn_2O_3$.

6. The selective catalytic reduction catalyst of claim 1, wherein the non-zeolite oxide material comprised in the coating has a loading in the range of from 10 to 100 g/l.

7. The selective catalytic reduction catalyst of claim 1, wherein the coating comprises a zeolite material comprising one or more of copper and iron, and
wherein the zeolite material comprised in the coating has at least one framework type selected from the group consisting of ABW, ACO, AEI, AEL, AEN, AET, AFG, AFI, AFN, AFO, AFR, AFS, AFT, AFV, AFX, AFY, AIT, ANA, APC, APD, AST, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, -CHI, -CLO, CON, CSV, CZP, DAC, DDR, DFO, DFT, DOH, DON, EAB, EDI, EEI, EMT, EON, EPI, ERI, ESV, ETR, EUO, *-EWT, EZT, FAR, FAU, FER, FRA, GIS, GIU, GME, GON, GOO, HEU, IFO, IFR, -IFU, IFW, IFY, IHW, IMF, IRN, IRR, -IRY, ISV, ITE, ITG, ITH, *-ITN, ITR, ITT, -ITV, ITW, IWR, IWS, IWV, IWW, JBW, JNT, JOZ, JRY, JSN, JSR, JST, JSW, KFI, LAU, LEV, LIO, -LIT, LOS, LOV, LTA, LTF, LTJ, LTL, LTN, MAR, MAZ, MEI, MEL, MEP, MER, MFI, MFS, MON, MOR, MOZ, *MRE, MSE, MSO, MTF, MTN, MTT, MTW, MVY, MWF, MWW, NAB, NAT, NES, NON, NPO, NPT, NSI, OBW, OFF, OKO, OSI, OSO, OWE, -PAR, PAU, PCR, PHI, PON, POS, PSI, PUN, RHO, -RON, RRO, RSN, RTE, RTH, RUT, RWR, RWY, SAF, SAO, SAS, SAT, SAV, SBE, SBN, SBS, SBT, SEW, SFE, SFF, SFG, SFH, SFN, SFO, SFS, *SFV, SFW, SGT, SIV, SOD, SOF, SOS, SSF, *SSO, SSY, STF, STI, *STO, STT, STW, -SVR, SW, SZR, TER, THO, TOL, TON, TSC, TUN, UEI, UFI, UOS, UOV, UOZ, USI, UTL, UWY, VET, VFI, VNI, VSV, WEI, -WEN, YUG, ZON, and mixtures thereof.

8. The selective catalytic reduction catalyst of claim 7, wherein the zeolite material comprises copper in an amount, calculated as CuO, in the range of 0.1 to 10 weight-% based on the total weight of the zeolite material,
wherein from 95 to 100 weight-% of the framework structure of the zeolite material consists of Si, Al, O, and optionally H,
wherein the framework structure of the zeolite material comprises Si and Al, and
wherein the framework structure of the zeolite material has a molar ratio of Si to Al, calculated as molar $SiO_2:Al_2O_3$, in the range of from 2:1 to 50:1.

9. The selective catalytic reduction catalyst of claim 1, wherein the coating comprises the zeolite material at a loading in the range of from 60 to 300 g/l.

10. The selective catalytic reduction catalyst of claim 1, wherein the coating further comprises a metal oxide binder,
wherein the metal oxide binder comprises one or more selected from the group consisting of zirconia, alumina, titania, silica, and mixtures thereof,
wherein the coating comprises the metal oxide binder at a loading in the range of from 1 to 12 g/l.

11. The selective catalytic reduction catalyst of claim 1, wherein the coating comprises a vanadium oxide,
wherein the vanadium oxide is one or more of a vanadium (V) oxide and a vanadium (IV) oxide,
wherein the vanadium oxide optionally comprises one or more of tungsten, iron, and antimony, and
wherein the vanadium oxide is supported on an oxide material comprising at least one selected from the group consisting of titanium, silicon, zirconium, titania, and tungsten.

12. An exhaust gas treatment system for treating an exhaust gas stream, comprising the selective catalytic reduction catalyst according to claim 1 and at least one selected from the group consisting of a diesel oxidation catalyst, a selective catalytic reduction catalyst, an ammonia oxidation catalyst, and a filter.

13. A process for preparing a selective catalytic reduction catalyst, comprising:
(a) providing a flow-through substrate comprising an inlet end, an outlet end, a substrate axial length extending from the inlet end to the outlet end, and a plurality of passages defined by internal walls of the substrate extending therethrough;
(b) preparing a slurry comprising a non-zeolite oxide material comprising manganese and one or more metals of the groups 4 to 11 and 13 of the periodic table, and further comprising one or more of a vanadium oxide and a zeolite material comprising one or more of copper and iron, and water;
(c) disposing the slurry obtained in (b) on the surface of the internal walls of the flow-through substrate according to (a), obtaining a slurry-treated substrate;
(d) optionally drying the slurry-treated substrate obtained in (c), obtaining the substrate having a coating disposed thereon;
(e) calcining the slurry-treated substrate obtained in (c), or the substrate having a coating disposed thereon obtained in (d), obtaining the selective catalytic reduction catalyst.

14. A method for selectively catalytically reducing nitrogen oxides in an exhaust gas stream, said method comprising passing the exhaust gas stream through the selective catalytic reduction catalyst of claim 1.

15. A selective catalytic reduction catalyst for the treatment of an exhaust gas of a diesel engine, comprising:
a flow-through substrate comprising an inlet end, an outlet end, a substrate axial length extending from the inlet end to the outlet end, and a plurality of passages defined by internal walls of the flow-through substrate extending therethrough; and
a coating disposed on the surface of the internal walls of the substrate,
wherein the coating comprises a non-zeolite oxide material comprising manganese and one or more metals of the groups 4 to 11 and 13 of the periodic table, and further comprises one or more of a vanadium oxide and a zeolite material comprising one or more of copper and iron,
wherein the coating comprises the non-zeolite oxide material at a loading (l1), and the one or more of a vanadium oxide and a zeolite material comprising one or more of copper and iron at a loading (l2), and
wherein the ratio of loading (l1) to loading (l2), (l1):(l2), is in the range of from 0.1:1 to 10:1,
wherein from 90 to 100 weight-% of the non-zeolitic oxidic material consists of oxygen, manganese and aluminum.

16. A selective catalytic reduction catalyst for the treatment of an exhaust gas of a diesel engine, comprising:
a flow-through substrate comprising an inlet end, an outlet end, a substrate axial length extending from the inlet end to the outlet end, and a plurality of passages defined by internal walls of the flow-through substrate extending therethrough; and a coating disposed on the surface of the internal walls of the substrate, wherein the coating comprises a non-zeolite oxide material comprising manganese and one or more metals of the groups 4 to 11 and 13 of the periodic table, and further comprises one or more of a vanadium oxide and a zeolite material comprising one or more of copper and iron, wherein the coating comprises the non-zeolite oxide material at a loading (l1), and the one or more of a vanadium oxide and a zeolite material comprising one or more of copper and iron at a loading (l2), and wherein the ratio of loading (l1) to loading (l2), (l1):(l2), is in the range of from 0.1:1 to 10:1, wherein from 70 to 90 weight of the non-zeolitic oxidic material consist of titania, from 2 to 8 weight of the non-zeolitic oxidic material consist of manganese, calculated as MnO, from 2 to 8 weight-% of the non-zeolitic oxidic material consist of silicon, calculated as $SiO_2$, and from 0.5 to 4 weight-% of the non-zeolitic oxidic material consist of iron, calculated as FeO.

* * * * *